US012581454B2

(12) United States Patent　　　　(10) Patent No.:　US 12,581,454 B2

He et al.　　　　　　　　　　　　　　(45) Date of Patent:　　Mar. 17, 2026

---

(54) ANCHOR TERMINAL DETERMINATION METHOD, INFORMATION SENDING METHOD, COMMUNICATION NODE, AND STORAGE MEDIUM

(71) Applicant: ZTE CORPORATION, Shenzhen (CN)

(72) Inventors: Haigang He, Shenzhen (CN); Youxiong Lu, Shenzhen (CN); Weimin Xing, Shenzhen (CN); Jie Chen, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 320 days.

(21) Appl. No.: 18/261,138

(22) PCT Filed: Jan. 14, 2022

(86) PCT No.: PCT/CN2022/072054

§ 371 (c)(1),
(2) Date: Jul. 12, 2023

(87) PCT Pub. No.: WO2022/152251

PCT Pub. Date: Jul. 21, 2022

(65) Prior Publication Data

US 2024/0089909 A1　　Mar. 14, 2024

(30) Foreign Application Priority Data

Jan. 15, 2021　(CN) .......................... 202110057411.4

(51) Int. Cl.
*H04W 64/00*　　　(2009.01)
*H04W 72/25*　　　(2023.01)
*H04W 72/40*　　　(2023.01)

(52) U.S. Cl.
CPC ......... *H04W 64/006* (2013.01); *H04W 72/25* (2023.01); *H04W 72/40* (2023.01)

(58) Field of Classification Search
CPC ... H04W 64/006; H04W 72/25; H04W 72/40; H04W 4/02; H04W 4/40; H04W 4/44;
(Continued)

(56) References Cited

U.S. PATENT DOCUMENTS

| | | | |
|---|---|---|---|
| 9,351,146 B2 * | 5/2016 | Turányi | ............... H04W 8/06 |
| 10,536,889 B2 * | 1/2020 | Lemoine | ........... H04W 60/005 |

(Continued)

FOREIGN PATENT DOCUMENTS

| | | |
|---|---|---|
| CN | 105578563 A | 5/2016 |
| CN | 110383862 A | 10/2019 |

(Continued)

OTHER PUBLICATIONS

International Search Report in Application No. PCT/CN2022/072054, dated Apr. 13, 2022, 4 pages, including translation.

(Continued)

*Primary Examiner* — Don N Vo

(74) *Attorney, Agent, or Firm* — Morgan, Lewis & Bockius LLP

(57)　　　　　ABSTRACT

Provided are an anchor terminal determination method, an information sending method, a communication node, and a storage medium. The anchor terminal determination method includes receiving information sent by a target terminal, determining a target parameter according to the information sent by the target terminal, and determining that the first terminal is an anchor terminal in a case where the target parameter satisfies a set restriction condition.

20 Claims, 11 Drawing Sheets

(58) Field of Classification Search

CPC ..... H04W 76/14; H04W 92/18; H04W 64/00; H04W 24/08; G01S 1/042; G01S 2205/01; G01S 5/0072; G01S 5/0205; G01S 5/0252; H04L 5/0048; H04L 5/0051; Y02D 30/70

USPC ...................................................... 455/456.2

See application file for complete search history.

(56) References Cited

U.S. PATENT DOCUMENTS

| | | | |
|---|---|---|---|
| 2010/0029276 A1* | 2/2010 | Hwang | H04W 36/304 |
| | | | 455/436 |
| 2016/0066174 A1 | 3/2016 | Kim et al. | |
| 2016/0095080 A1 | 3/2016 | Khoryaev et al. | |
| 2017/0034688 A1 | 2/2017 | Kim et al. | |

| | | | |
|---|---|---|---|
| 2019/0239181 A1 | 8/2019 | Gangakhedkar et al. | |
| 2022/0174560 A1* | 6/2022 | Wu | H04W 36/0058 |
| 2022/0322274 A1* | 10/2022 | Keating | H04W 64/00 |

FOREIGN PATENT DOCUMENTS

| | | |
|---|---|---|
| CN | 110536234 A | 12/2019 |
| CN | 111770438 A | 10/2020 |
| CN | 112867146 A | 5/2021 |
| KR | 10-2016-0143692 A | 12/2016 |

OTHER PUBLICATIONS

Extented European Search Report in Application No. 22739126.5, dated Oct. 22, 2024, 10 pages.
First Office Action in Korean Application No. 10-2023-7027629, dated Nov. 25, 2025, 16 pages, including translation.

* cited by examiner

ANCHOR TERMINAL DETERMINATION METHOD, INFORMATION SENDING METHOD, COMMUNICATION NODE, AND STORAGE MEDIUM

CROSS REFERENCE TO RELATED APPLICATIONS

This is a National Stage Application, filed under 35 U.S.C. 371, based on International Patent Application No. PCT/CN2022/072054, filed on Jan. 14, 2022, which claims priority to Chinese Patent Application No. 202110057411.4, filed with the China National Intellectual Property Administration (CNIPA) on Jan. 15, 2021, the disclosures of which are incorporated herein by reference in their entireties.

TECHNICAL FIELD

The present application relates to the field of wireless communication networks, for example, an anchor terminal determination method, an information sending method, a communication node, and a storage medium.

BACKGROUND

In a sidelink communication system, traffic between user equipments (UEs) may be directly transmitted from a data source UE to a target UE through a sidelink without passing through a network side, that is, without being forwarded by cellular links between UEs and a base station. The sidelink communication not only saves wireless spectrum resources but also reduces data transmission pressure of a core network. Moreover, the sidelink communication reduces system resource occupation, increases spectrum efficiency, and reduces communication delay. In a process of the sidelink communication, there is no scheme for determining an anchor UE that may be used for transmitting positioning-related information. A UE is unable to autonomously determine whether it can be used as an anchor UE, which affects the transmission of the positioning-related information. The UE is unable to accurately determine the location of itself, which affects the reliability of the sidelink communication.

SUMMARY

The present application provides an anchor terminal determination method, an information sending method, a communication node, and a storage medium, so as to improve the reliability of the sidelink communication.

Embodiments of the present application provide an anchor terminal determination method. The method includes the following: a target parameter is determined according to information sent by a target terminal, and the first terminal is determined as an anchor terminal in the case where the target parameter satisfies a set restriction condition.

Embodiments of the present application also provide an information sending method. The method includes the following: information is sent to a first terminal, where the information sent to the first terminal is configured to determine at least one of a target parameter or a set restriction condition, and information sent by the first terminal as an anchor terminal is received in a case where the target parameter satisfies the set restriction condition.

Embodiments of the present application also provide a communication node. The communication node includes a memory, a processor, and a computer program stored on the memory and runnable on the processor. When executing the program, the processor implements the preceding anchor terminal determination method or the preceding information sending method.

Embodiments of the present application also provide a computer-readable storage medium storing a computer program which, when executed by a processor, implements the preceding anchor terminal determination method or the preceding information sending method.

DETAILED DESCRIPTION

Figure 1:
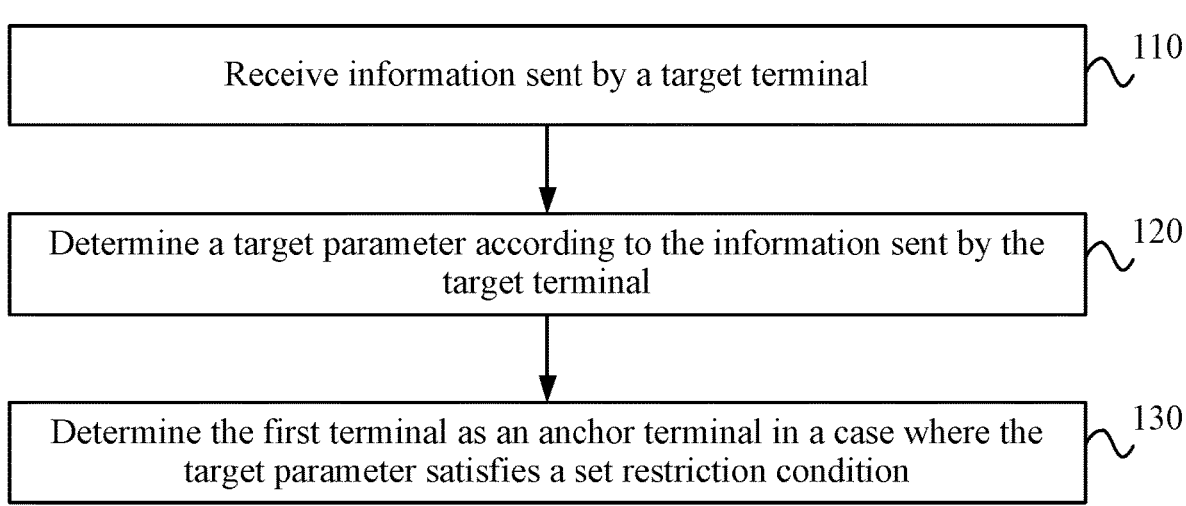
FIG. 1 is a flowchart of an anchor terminal determination method according to an embodiment.

The present application is described in conjunction with drawings and embodiments. The specific embodiments described herein are intended to explain the present application. For ease of description, only parts related to the present application are illustrated in the drawings.

The sidelink communication has two resource allocation modes, that is, scheduling of a base station and independent selection of a terminal. For the mode of the independent selection of a terminal, the terminal may monitor the usage of resources in the resource pool range and according to the monitoring result, the terminal may preferentially select resources that are not occupied by other terminals in the resource pool or resources with less interference with transmissions of other terminals for signaling and data transmission. An anchor UE refers to a UE that is capable of sending positioning-related information (such as a positioning reference signal and location information) to other UEs. The sidelink communication system usually has many anchor UEs. How to determine an anchor UE that may be used for transmitting positioning-related information or how a UE may autonomously determine whether itself may be used as an anchor UE for transmitting the positioning-related information affects the reliability of the sidelink communication.

Embodiments of the present application provide an anchor terminal determination method. The method may be applied to a first terminal. The first terminal autonomously determines whether itself may serve as an anchor UE to send positioning-related information to other terminals, that is, the UE may serve as the anchor UE when a set restriction condition is satisfied, thereby reducing interference with other terminals that transmit positioning-related information.

FIG. 1 is a flowchart of an anchor terminal determination method according to an embodiment. As shown in FIG. 1, the method provided in this embodiment includes 110 to 130.

In 110: Information sent by a target terminal is received.

In 120: A target parameter is determined according to the information sent by the target terminal.

In 130: It is determined that the first terminal is an anchor terminal in the case where the target parameter satisfies a set restriction condition.

In this embodiment, the target terminal refers to a UE that may send positioning-related information to the first terminal. The sent information provides a basis for the first terminal to determine whether the first terminal is an anchor UE. For example, the target terminal sends sidelink control information (SCI) to the first terminal, based on the SCI, the first terminal may determine the distance between the first terminal and the target terminal. If the distance satisfies the set restriction condition, the first terminal determines that the first terminal is an anchor UE. After determining the first terminal as an anchor UE, the first terminal may send the positioning-related information, such as a positioning reference signal and location information, to other surrounding terminals (including the target terminal), so as to implement the sidelink communication.

The target terminal in this embodiment may be an anchor UE or a non-anchor UE. Multiple target terminals may be provided. The first terminal determines comprehensively whether or not the first terminal is an anchor UE according to received information sent by each target terminal.

In this embodiment, the first terminal determines whether the first terminal is an anchor UE according to the information sent by the target terminal in two manners. In the first manner, the first terminal determines, according to the information sent by the target terminal, a target parameter, for example, the distance between the first terminal and the target terminal, reference signal received power (RSRP) of a reference signal received by the first terminal from the target terminal, and an included angle between the movement direction of the first terminal and the movement direction of the target terminal; then the first terminal compares the target parameter with a set restriction condition, and the first terminal is determined as an anchor UE if the target parameter satisfies the set restriction condition. In the second manner, the target terminal determines which UEs may serve as anchor UEs and notifies the first terminal of the anchor UEs by sending information to the first terminal. The first terminal determines whether the first terminal is one of the anchor UEs according to the information sent by the target terminal, and the first terminal is determined as an anchor UE if the first terminal belongs to the anchor UEs.

In an embodiment, the information sent by the target terminal includes at least one of the following: a first positioning reference signal (that is, a positioning reference signal sent by the target terminal to the first terminal); first SCI (that is, the SCI sent by the target terminal to the first terminal); a first positioning reference signal and first location information (that is, location information sent by the target terminal to the first terminal); a demodulation reference signal; or a target channel.

In an embodiment, the target parameter includes at least one of the following: a road direction indicated by the target terminal for the first terminal; a road identity indicated by the target terminal for the first terminal; a movement direction indicated by the target terminal for the first terminal; the distance between the first terminal and the target terminal; RSRP of a reference signal received by the first terminal from the target terminal; a first included angle between the movement direction of the first terminal and the movement direction of the target terminal; a remainder obtained from dividing a first included angle between the movement direction of the first terminal and the movement direction of a target terminal by 90 or $\pi/2$; a second included angle between the road direction in which the first terminal is located and the road direction in which the target terminal is located; a remainder obtained from dividing a second included angle between the road direction in which the first terminal is located and the road direction in which the target terminal is located by 90 or $\pi/2$; or a user equipment identity of the anchor terminal.

For example, the first terminal may determine, by receiving the first SCI sent by the target terminal, the road identity, the road direction, and/or the movement direction indicated by the target terminal for the first terminal. If the road identity, the road direction, and/or the movement direction indicated by the target terminal for the first terminal are consistent with the road identity, the road direction, and/or the movement direction where the target terminal is located, the first terminal may determine itself as an anchor UE.

For example, the first terminal may determine the distance between the first terminal and the target terminal by receiving a first positioning reference signal (or a first positioning reference signal and first location information) sent by the target terminal.

For example, the first terminal may determine the RSRP of the received reference signal from the target terminal by measuring a reference signal (such as a first positioning reference signal or a demodulation reference signal) sent by the target terminal.

For example, the first terminal may determine a first included angle and/or a second included angle between the first terminal and the target terminal by receiving the first SCI sent by the target terminal.

For example, the target terminal determines which UEs may serve as anchor UEs and sends user equipment identities of these UEs to the first terminal through the first SCI. After receiving the first SCI, the first terminal determines whether the user equipment identity of the first terminal belongs to the user equipment identities indicated in the first SCI and thus determines whether the first terminal is an anchor UE. In this case, the first SCI sent by the target terminal may be used for requesting a receiving end UE as an anchor UE to send positioning-related information to the target terminal. This type of target terminal is recorded as a second terminal. After determining itself as an anchor UE, the first terminal may send information such as a second positioning reference signal and second location information to the second terminal.

In an embodiment, the set restriction condition includes that the value of the target parameter does not exceed the set value range. The set value range includes at least one of the following: a road direction in which the first terminal is located; an identity of the road in which the first terminal is located; a movement direction of the first terminal; a value range of the distance between the first terminal and the target terminal; a threshold of the distance between the first terminal and the target terminal; a value range of RSRP of a reference signal received by the first terminal from the target terminal; a threshold of RSRP of a reference signal received by the first terminal from the target terminal; a value range of the first included angle; a threshold of the first included angle; a value range of the second included angle; a threshold of the second included angle; a value range of a remainder obtained from dividing the first included angle by 90 or $\pi/2$; a threshold of a remainder obtained from dividing the first included angle by 90 or $\pi/2$; a value range of a remainder obtained from dividing the second included angle by 90 or $\pi/2$; or a threshold of a remainder obtained from dividing the second included angle by 90 or $\pi/2$.

This embodiment mainly focuses on the preceding first manner. The first terminal determines a target parameter according to the information sent by the target terminal. The target parameter includes at least one of the following: the road direction in which the first terminal is located; the identity of the road in which the first terminal is located; the movement direction of the first terminal; the distance between the first terminal and the target terminal; the RSRP of a reference signal received by the first terminal from the target terminal; the first included angle; the remainder of the first included angle; the second included angle; or the remainder of the second included angle. Correspondingly, the set restriction condition includes the value range and/or threshold of these target parameters. The threshold may be an upper limit value, a lower limit value, and/or a grade division value. On this basis, the first terminal compares the target parameter with the set restriction condition and determines itself as an anchor UE if the target parameter satisfies the set restriction condition.

In an embodiment, the target parameter includes a user equipment identity of the anchor terminal, and the set restriction condition includes that a source identity (ID) of the first terminal belongs to the user equipment identity of the anchor terminal.

This embodiment mainly focuses on the preceding second manner. The first terminal determines the user equipment identities of the anchor UEs according to the information sent by the target terminal and determines whether the first terminal belongs to one of the anchor UEs.

In an embodiment, the information sent by the target terminal includes the first SCI, and the operation in 120 includes determining a user equipment identity of the anchor terminal according to the first SCI.

In this embodiment, the first terminal determines the user equipment identity of the anchor terminal according to the first SCI sent by the target terminal.

In an embodiment, the target parameter includes the user equipment identity of the anchor terminal, and the user equipment identity of the anchor terminal is a source ID of the anchor terminal.

In this embodiment, the user equipment identity of the anchor UE refers to a source ID of the anchor UE.

In an embodiment, at least one target terminal is provided, and the set restriction condition includes that the number of target terminals whose corresponding target parameters satisfy the set restriction condition does not exceed the number threshold, or the set restriction condition includes that the number of target terminals whose corresponding target parameters satisfy the set restriction condition is smaller than the number threshold.

In this embodiment, one or more target terminals are provided. For a target terminal, if the target parameter of the target terminal satisfies the set restriction condition, this target terminal is an anchor UE. For the first terminal, the set restriction condition includes that the number of anchor UEs in the target terminals does not exceed the number threshold or is smaller than the number threshold.

In an embodiment, the target terminal includes at least one anchor terminal, and information sent by each target terminal includes a first positioning reference signal and first location information.

In this embodiment, the target terminals include one or more anchor UEs. In this case, each target terminal may send the first positioning reference signal and the first location information to the first terminal for the first terminal to determine the target parameter.

In an embodiment, the target terminal includes at least one second terminal, information sent by each target terminal includes the first SCI including positioning request information.

The positioning request information is configured to request the first terminal to send one of the following information: a second positioning reference signal, or a second positioning reference signal and second location information.

This embodiment mainly focuses on the preceding second manner. According to the positioning request information in the first SCI sent by the second terminal, the first terminal determines whether the first terminal belongs to one of the anchor UEs. If the first terminal belongs to one of the anchor UEs, the first terminal serves as an anchor UE and sends a second positioning reference signal according to the request of the second terminal. Besides, the first terminal may also send the second location information to the second terminal.

In an embodiment, the operation of 120 includes acquiring, according to the first SCI sent by the target terminal, the movement direction of the target terminal, and calculating a first included angle between the movement direction of the first terminal and the movement direction of the target terminal.

In an embodiment, the operation of 120 includes measuring the distance between the first terminal and the target terminal according to a first positioning reference signal sent by the target terminal.

In an embodiment, the operation of 120 includes measuring RSRP of a reference signal received by the first terminal from the target terminal according to a first positioning reference signal or a demodulation reference signal sent by the target terminal.

In an embodiment, the method also includes the following:

In 100: Through radio resource control (RRC) signaling, indication information of the set value range of the target parameter is received.

In this embodiment, the set value range (for example, the value range and/or threshold) of the target parameter is configured by the network side, and the first terminal receives the indication information through the RRC signaling and determines the set value range for comparison of the target parameter according to the indication information.

In an embodiment, the set restriction condition includes a first restriction condition and a second restriction condition, and the operation of 130 includes the following:

In 1310: It is determined that the first terminal is a candidate anchor terminal in a case where the target parameter satisfies the first restriction condition.

In 1320: It is determined that the first terminal is the anchor terminal in a case where the second restriction condition is satisfied.

In this embodiment, if the target parameter satisfies the first restriction condition, the first terminal determines itself as a candidate anchor UE that has the ability to select a time-frequency resource for sending the positioning-related information (including a second positioning reference signal), but whether to send the positioning-related information ultimately needs to be determined according to the second restriction condition.

In an embodiment, at least one target terminal is provided, and the first restriction condition includes that the number of target terminals whose corresponding target parameters satisfy the set restriction condition does not exceed the number threshold, or the first restriction condition includes that the number of target terminals whose corresponding target parameters satisfy the set restriction condition is smaller than the number threshold.

In this embodiment, the first restriction condition includes that the number of anchor UEs in the target terminals does not exceed the number threshold or is smaller than the number threshold.

In an embodiment, the method also includes the following:

In 1312: A time-frequency resource for sending a second positioning reference signal is determined in the case where the first terminal is determined as the candidate anchor terminal.

In this embodiment, the first terminal serving as a candidate anchor terminal selects the time-frequency resource for sending the second positioning reference signal.

In an embodiment, the operation of 1320 includes the following:

A third positioning reference signal sent by a non-first terminal is detected; and in a case where the detection result of the third positioning reference signal satisfies the second restriction condition, it is determined the first terminal as the anchor terminal, and the second positioning reference signal is sent; and in a case where the detection result of the third positioning reference signal does not satisfy the second restriction condition, it is determined that the first terminal is not the anchor terminal according to the detection result of the third positioning reference signal, and sending of the second positioning reference signal is canceled. Alternatively, in a case where the detection result of the third positioning reference signal does not satisfy the second restriction condition, it is determined that the first terminal is the anchor terminal, and the second positioning reference signal is sent, and in a case where the detection result of the third positioning reference signal satisfies the second restriction condition, it is determined that the first terminal is not the anchor terminal according to the detection result of the third positioning reference signal, and sending of the second positioning reference signal is canceled.

In this embodiment, the first terminal detects the third positioning reference signal sent by a non-first terminal (including the target terminal and/or the second terminal), and if the detection result satisfies the second restriction condition, the first terminal serving as an anchor UE sends the second positioning reference signal; otherwise, the first terminal is not an anchor UE, and sending of the second positioning reference signal is canceled.

In an embodiment, the method also includes the following:

In 1314: In a case where the first terminal is determined as the candidate anchor terminal, a time-frequency resource of a target channel and a time-frequency resource of a second positioning reference signal are determined. The target channel is configured to indicate the time-frequency resource of the second positioning reference signal.

In this embodiment, serving as a candidate anchor terminal, the first terminal selects the time-frequency resources for the target channel and the second positioning reference signal.

In an embodiment, the operation of 1320 includes the following:

A target channel sent by a non-first terminal is detected; and in a case where the detection result of the target channel satisfies the second restriction condition, the first terminal is determined as the anchor terminal, and the second positioning reference signal is sent; and in a case where the detection result of the target channel does not satisfy the second restriction condition, the first terminal is not determined as the anchor terminal, and sending of the target channel is canceled. Alternatively, in a case where the detection result of the target channel does not satisfy the second restriction condition, it is determined that the first terminal is the anchor terminal, and the second positioning reference signal is sent; and in a case where the detection result of the target channel satisfies the second restriction condition, it is determined that the first terminal is not the anchor terminal, and sending of the target channel is canceled.

In this embodiment, the first terminal detects the target channel sent by a non-first terminal (including the target terminal and/or the second terminal), and if the detection result satisfies the second restriction condition, the first terminal serving as an anchor UE sends the target channel; otherwise, the first terminal is not an anchor UE, and sending of the target channel is canceled. The first terminal indicates the time-frequency resource of the second positioning reference signal by sending the target channel so that the receiving end UE can accurately receive the second positioning reference signal.

In an embodiment, the method also includes the following:

In 102: The second SCI is sent, and the second SCI is used for indicating that the first terminal supports for being the anchor terminal.

In this embodiment, the first terminal sends the second SCI to notify other UEs that the first terminal may be used as an anchor terminal. For example, an anchor UE declaration is included in the second SCI to indicate that the first terminal has the ability to send positioning-related information or the first terminal allows other UEs to send positioning request information to the first terminal.

In an embodiment, the second SCI is also configured to indicate a time limit for using the first terminal as the anchor terminal.

The anchor terminal determination method is described below in conjunction with embodiments.

Figure 2:
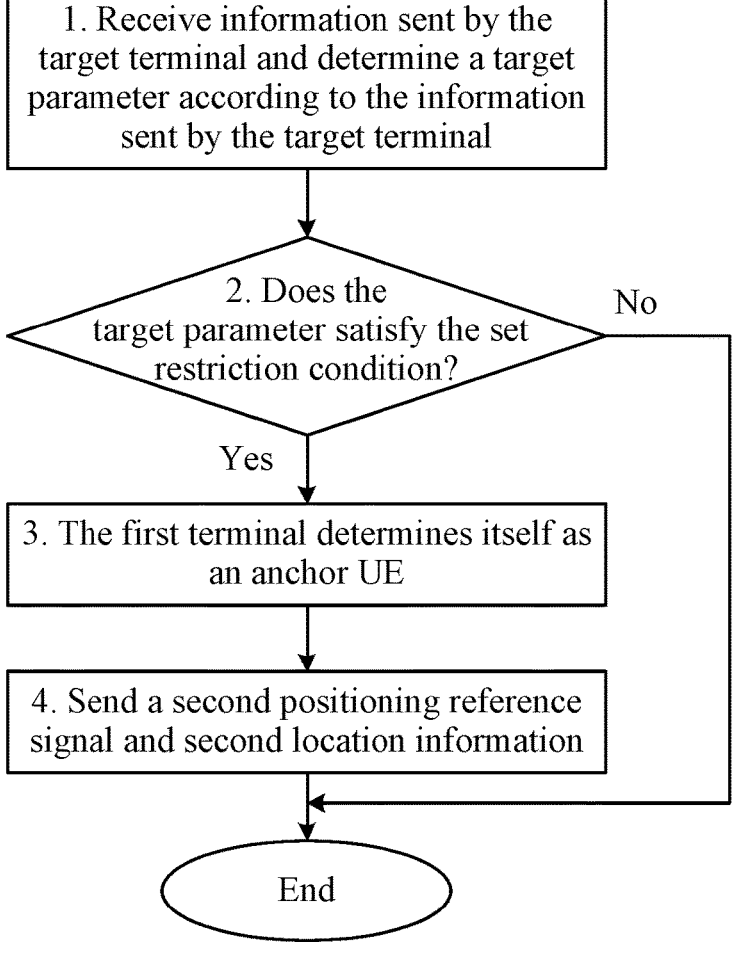
FIG. 2 is a diagram illustrating that a first terminal autonomously determines an anchor terminal according to an embodiment.

FIG. 2 is a diagram illustrating that a first terminal autonomously determines an anchor terminal according to an embodiment. In this embodiment, the first terminal autonomously determines whether the first terminal may become an anchor UE. The procedures are as follows:

In operation 1, the first terminal receives information sent by the target terminal and determines, according to the information sent by the target terminal, a target parameter between the first terminal and the target terminal. One of the following may be included:

The distance between the first terminal and the target terminal is acquired by receiving a first positioning reference signal of the target terminal; or RSRP of a reference signal received by the first terminal from the target terminal is acquired by measuring the first positioning reference signal of the target terminal.

The first terminal may also determine, by receiving the first SCI sent by the target terminal, a target parameter between the first terminal and the target terminal, for example, a first included angle between the movement direction of the first terminal and the movement direction of the target terminal and/or a second included angle between the road direction in which the first terminal is located and the road direction in which the target terminal is located.

In another case, the target terminal includes a second terminal, and the first terminal receives the SCI of the second terminal. The SCI includes the positioning request information from which the first terminal acquires the user equipment identity (UE ID) such as a source ID of a non-second terminal notified by the second terminal. The user equipment identity of the non-second terminal notified by the second terminal is used for requesting a corresponding terminal to send positioning-related information.

The first terminal acquires the distance between the first terminal and the target terminal in the following manner: The first terminal receives a first positioning reference signal of the target terminal and measures the distance between the first terminal and the target terminal according to a time parameter of the first positioning reference signal departing from the target terminal and arriving at the first terminal. Alternatively, the first terminal sends a positioning reference signal to the target terminal and receives the first positioning reference signal from the target terminal, and according to time parameters during transmission of the two positioning reference signals, the first terminal measures the distance between the first terminal and the target terminal.

The first terminal acquires the first included angle between the movement direction of the first terminal and the movement direction of the target terminal in the following manner: The first terminal receives the first SCI of the target terminal, acquires information about the movement direction of the target terminal which is indicated by the first SCI, and calculates the first included angle based on the movement direction of the target terminal and the movement direction of the first terminal.

The first terminal acquires the second included angle between the road direction in which the first terminal is located and the road direction in which the target terminal is located in the following manner: The first terminal receives the first SCI of the target terminal, acquires information about the road direction in which the target terminal is located and which is indicated by the first SCI, and calculates the second included angle based on the road direction in which the target terminal is located and the road direction in which the first terminal is located.

In operation 2, it is determined whether the target parameter satisfies the set restriction condition.

Case A: The target terminal is an anchor UE. The first terminal calculates the number of anchor UEs whose target parameters satisfy the set restriction condition. The first terminal determines whether the first terminal is an anchor UE based on the number of anchor UEs satisfying the set restriction condition. If the number of anchor UEs satisfying the set restriction condition does not exceed the number threshold, the first terminal may become an anchor UE; and if the number of anchor UEs satisfying the set restriction condition reaches the number threshold, the first terminal is not an anchor UE.

An anchor UE whose target parameter satisfies the set restriction condition may mean that the value of the target parameter between the first terminal and the anchor UE satisfies at least one of the following set restriction conditions:

The road direction indicated by the target terminal for the first terminal is consistent with the road direction in which the first terminal is located; the road identity indicated by the target terminal for the first terminal is consistent with the identity of the road in which the first terminal is located; the movement direction indicated by the target terminal for the first terminal is consistent with the movement direction of the first terminal; the distance between the first terminal and the target terminal does not exceed a threshold of a distance; the distance between the first terminal and the target terminal belongs to a restricted distance range (that is, the value range of the distance); the RSRP of a reference signal received from the target terminal by the first terminal does not exceed the threshold of the RSRP; the RSRP of a reference signal received from the target terminal by the first terminal belongs to a restricted RSRP range (that is, the value range of the RSRP); the first included angle (denoted as $\alpha$) between the movement direction of the first terminal and the movement direction of the target terminal does not exceed the threshold of the first included angle; $\alpha$ is within a value range of the first included angle; the remainder of $\alpha$ divided by 90 or $\pi/2$, that is, mod $(\alpha, 90)$ or mod $(\alpha, \pi/2)$, does not exceed a threshold corresponding to the first included angle; the remainder of a divided by 90 or $\pi/2$, that is, mod $(\alpha, 90)$ or mod $(\alpha, \pi/2)$, is within a value range corresponding to the first included angle; the second included angle (denoted as $\beta$) between the road direction in which the first terminal is located and the road direction in which the target terminal is located does not exceed the threshold of the second included angle; $\beta$ is within a value range of the second included angle; the remainder of $\beta$ divided by 90 or $\pi/2$, that is, mod $(\beta, 90)$ or mod $(\beta, \pi/2)$, does not exceed a threshold corresponding to the second included angle; or the remainder of $\beta$ divided by 90 or $\pi/2$, that is, mod $(\beta, 90)$ or mod $(\beta, \pi/2)$, is within a value range corresponding to the second included angle.

The preceding threshold of the distance may be notified by the base station to the first terminal through the RRC signaling or may be notified by the second terminal to the first terminal through the first SCI.

The preceding range of the distance may be notified by the base station to the first terminal through the RRC signaling or may be notified by the second terminal to the first terminal through the first SCI. The distance range is notified in the following manner: The start value and the end value of the distance range are notified, and the distance range is expressed as [distance start value, distance end value];

alternatively, the start value and the distance interval of the distance range are notified, and the distance range is expressed as [distance start value, (distance start value+distance interval)].

The preceding threshold of the RSRP may be notified by the base station to the first terminal through the RRC signaling or may be notified by the second terminal to the first terminal through the first SCI.

The preceding range of the RSRP may be notified by the base station to the first terminal through the RRC signaling or may be notified by the second terminal to the first terminal through the first SCI. The RSRP range is notified in the following manner: The start value and the end value of the RSRP range are notified, and the RSRP range is expressed as [RSRP start value, RSRP end value]; alternatively, the start value and the RSRP interval of the RSRP range are notified, and the RSRP range is expressed as [RSRP start value, (RSRP start value+RSRP interval)].

The preceding angle-related threshold may be notified by the base station to the first terminal through the RRC signaling or may be notified by the second terminal to the first terminal through the first SCI, and the threshold may be an upper limit value of the first included angle and/or an upper limit value of the second included angle.

The preceding angle-related (including the first included angle, the second included angle, the remainder of the first included angle divided by 90 or $\pi/2$, and the remainder of the second included angle divided by 90 or $\pi/2$) value range may be notified by the base station to the first terminal through the RRC signaling or may be notified by the second terminal to the first terminal through the first SCI. The angle-related value range is notified in the following manner: The start value and the end value are notified, and the value range is expressed as [angle start value, angle end value]; alternatively, the start value and the interval are notified, and the value range is expressed as [start value, (start value+interval)].

Case B: The target terminal is not restricted to the anchor UE. Based on whether the target parameter between the first terminal and the target terminal satisfies the condition, the first terminal determines whether the first terminal is an anchor UE. The target terminal is a second terminal, that is, the target terminal may request the first terminal, serving as an anchor UE, to send positioning-related information to the target terminal.

The target parameter includes the user equipment identity (UE ID) notified by the second terminal, for example, one or more source IDs of one or more UEs that may be used as anchor UEs. If the source ID of the first terminal belongs to one of the source IDs notified by the second terminal, the first terminal determines itself as an anchor UE.

In operation 3, the first terminal determines that the first terminal is an anchor UE.

In operation 4, the first terminal sends a second positioning reference signal and second location information for a receiving end UE to calculate the geographical location of the receiving end UE.

Example one (Based on the distance between the first terminal and the target terminal, the first included angle of the movement direction, and the number of anchor UEs satisfying the set restriction condition, the first terminal determines whether the first terminal becomes an anchor UE.)

In operation 1, the first terminal receives the first positioning reference signal, the first SCI, and the first location information sent by the target terminal. The first SCI includes bits used for indicating the movement direction of the target terminal. The first SCI is carried by a physical sidelink control channel (PSCCH) or a physical sidelink shared channel (PSSCH). The geographic location information is carried by the PSSCH.

The first terminal determines the following target parameters according to the information sent by the target terminal:

the distance between the first terminal and the target terminal; and the first included angle between the movement direction of the first terminal and the movement direction of the target terminal.

Determining the distance between the first terminal and the target terminal includes the following: The first terminal first sends a positioning reference signal to the target terminal, receives a first positioning reference signal sent by the target terminal, and then calculates a time difference between sending the positioning reference signal and receiving the first positioning reference signal, that is, $\Delta t_2$. For the target terminal, the target terminal first receives the positioning reference signal sent by the first terminal, sends the first positioning reference signal to the first terminal, and then calculates the time difference between receiving the positioning reference signal and sending the first positioning reference signal, that is, $\Delta t_1$. The target terminal notifies the first terminal of $\Delta t_1$. The first terminal calculates an air propagation delay of the positioning reference signals, that is, $$\frac{\Delta t_2 - \Delta t_1}{2}.$$

Thus, the first terminal calculates the distance between the first terminal and the target terminal as $$\frac{\Delta t_2 - \Delta t_1}{2} \cdot C,$$

where C denotes the speed of light.

The first terminal acquires the first included angle in the following manner: The first terminal acquires the movement direction of the target terminal indicated by the target terminal through the first SCI by receiving the first SCI of the target terminal and calculates the first included angle based on the movement direction of the target terminal and the movement direction of the first terminal.

In operation 2, the first terminal determines whether the target parameter satisfies the set restriction condition. The set restriction condition includes that the number of target terminals (the target terminals are anchor UEs) satisfying the following conditions does not exceed the threshold:

The distance between the first terminal and the target terminal does not exceed the threshold of the distance; and the result of a remainder obtained from dividing the first included angle by $\pi/2$ does not exceed the threshold of the remainder obtained from dividing the first included angle by $\pi/2$.

In this example, the threshold of the distance, the threshold of the remainder obtained from dividing the first included angle by $\pi/2$, and the number threshold of anchor UEs are configured by the RRC signaling of the base station. For example, the RRC signaling configures that the threshold of the distance is 300 m, the threshold of the first included angle is not exceeding 15°, and the number threshold of anchor UEs is 5. The first terminal determines whether the target parameter satisfies the following three restriction conditions:

The distance between the first terminal and the target terminal does not exceed 300 m from the first terminal; the first included angle α between the movement direction of the first terminal and the movement direction of the target terminal satisfies that mod (α, π/2)≤15; and the number of anchor UEs satisfying the preceding two conditions is smaller than 5.

In operation 3, if the preceding restriction conditions are satisfied, the first terminal determines itself as an anchor UE.

In operation 4, the first terminal sends a second positioning reference signal and second location information for a receiving end UE to calculate the geographical location of the receiving end UE.

Figure 3A:
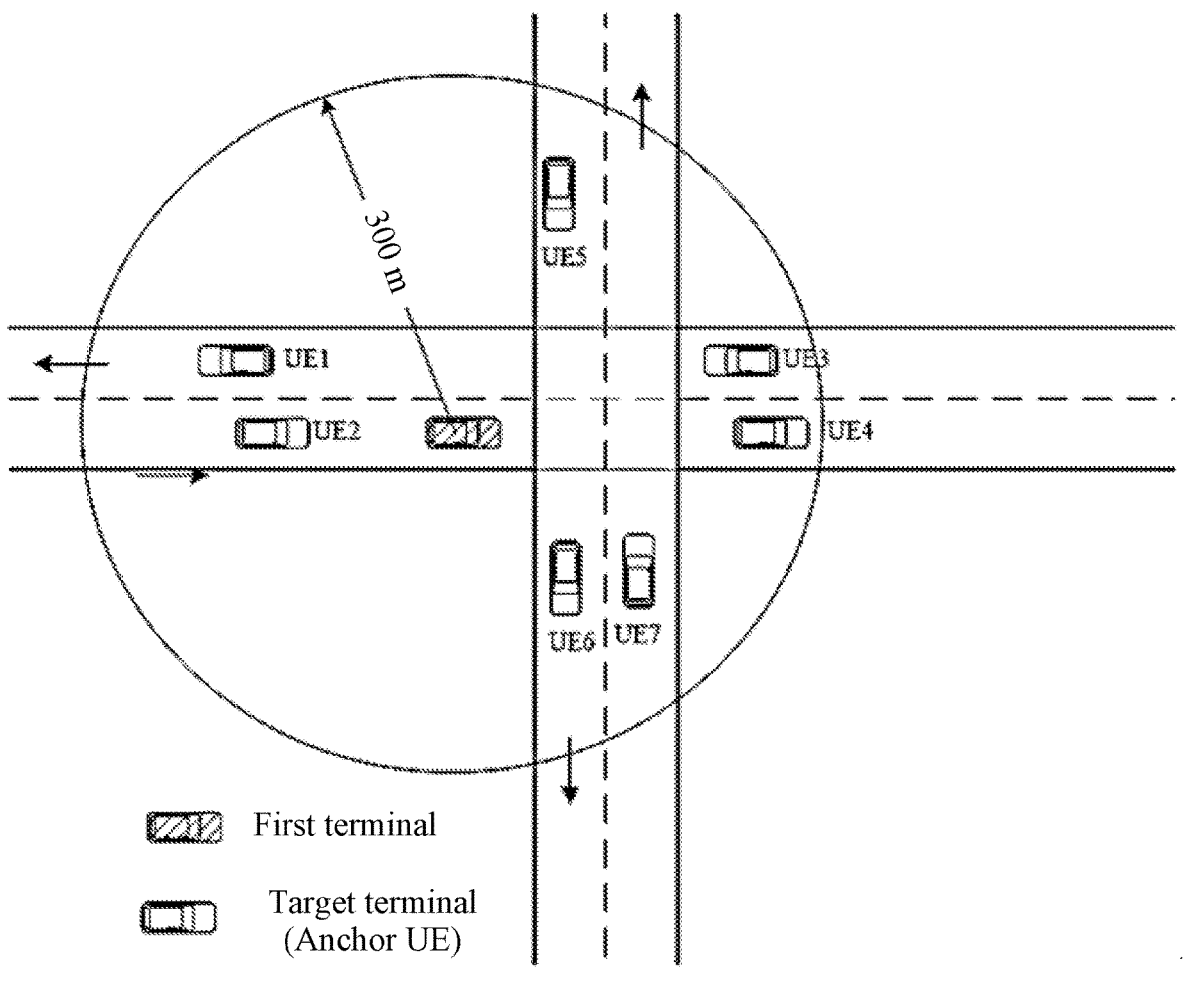
FIG. 3A is a diagram illustrating that the number of anchor UEs within a distance range is determined according to an embodiment.

FIG. 3A is a diagram illustrating that the number of anchor UEs within a distance range is determined according to an embodiment. As shown in FIG. 3A, the first terminal detects target terminals that satisfy the following conditions: The distance between the first terminal and the target terminal does not exceed 300 m; and the first included angle α between the movement direction of the first terminal and the movement direction of the target terminal satisfies that mod (α, π/2)≤15. The first terminal detects that the target terminals satisfying the preceding two conditions are UE1, UE2, UE3, and UE4, and the number of these UEs is smaller than the number threshold of anchor UEs, that is, 5. Therefore, the first terminal determines that the target parameters satisfy the set restriction conditions, thereby the first terminal becomes an anchor UE to send the positioning-related information.

Example two (Based on the distance between the first terminal and the target terminal, the second included angle of the road direction, and the number of anchor UEs satisfying the set restriction condition, the first terminal determines whether the first terminal becomes an anchor UE.)

In operation 1, the first terminal receives the first positioning reference signal and the first SCI sent by the target terminal. The first SCI includes bits for indicating the road direction in which the target terminal is located. The first SCI is carried by the PSCCH or the PSSCH. Geographic location information is carried by the PSSCH.

The first terminal determines the following target parameters according to the information sent by the target terminal:

the RSRP of a reference signal received by the first terminal from the target terminal; and the second included angle between the road direction in which the first terminal is located and the road direction in which the target terminal is located.

In this example, determining the RSRP of the reference signal received by the first terminal from the target terminal includes the following: The first terminal measures the first positioning reference signal sent by the target terminal and determines the RSRP between the target terminal and the first terminal.

Determining the second included angle includes the following: The first terminal acquires the road direction in which the target terminal is located by receiving the first SCI of the target terminal and thus calculates the second included angle between the road direction in which the first terminal is located and the road direction in which the target terminal is located.

In operation 2, the first terminal determines whether the target parameter satisfies the set restriction condition. The set restriction condition includes that the number of target terminals (the target terminals are anchor UEs) satisfying the following conditions does not exceed the threshold:

The RSRP of the reference signal received by the first terminal from the target terminal does not exceed the threshold of the RSRP; and the result of a remainder obtained from dividing the second included angle by π/2 does not exceed the threshold of the remainder obtained from dividing the second included angle by π/2.

In this embodiment, the threshold of the RSRP, the number threshold of anchor UEs, and the threshold of the remainder obtained from dividing the second included angle by π/2 are configured by the RRC signaling of the base station. For example, the RRC signaling configures that the threshold of the RSRP is −100 dBm, the number threshold of anchor UEs is 5, and the remainder obtained from dividing the second included angle by π/2 does not exceed 15°.

The first terminal determines whether the target parameter satisfies the following three restriction conditions:

The RSRP of the reference signal received by the first terminal from the target terminal does not exceed −100 dBm; the second included angle β between the movement direction of the first terminal and the movement direction of the target terminal satisfies that mod (β, π/2)≤15; and the number of anchor UEs satisfying the preceding two conditions is smaller than 5.

In operation 3, if the preceding restriction conditions are satisfied, the first terminal determines itself as an anchor UE.

In operation 4, the first terminal sends a second positioning reference signal and second location information for a receiving end UE to calculate the geographical location of the receiving end UE.

Figure 3B:
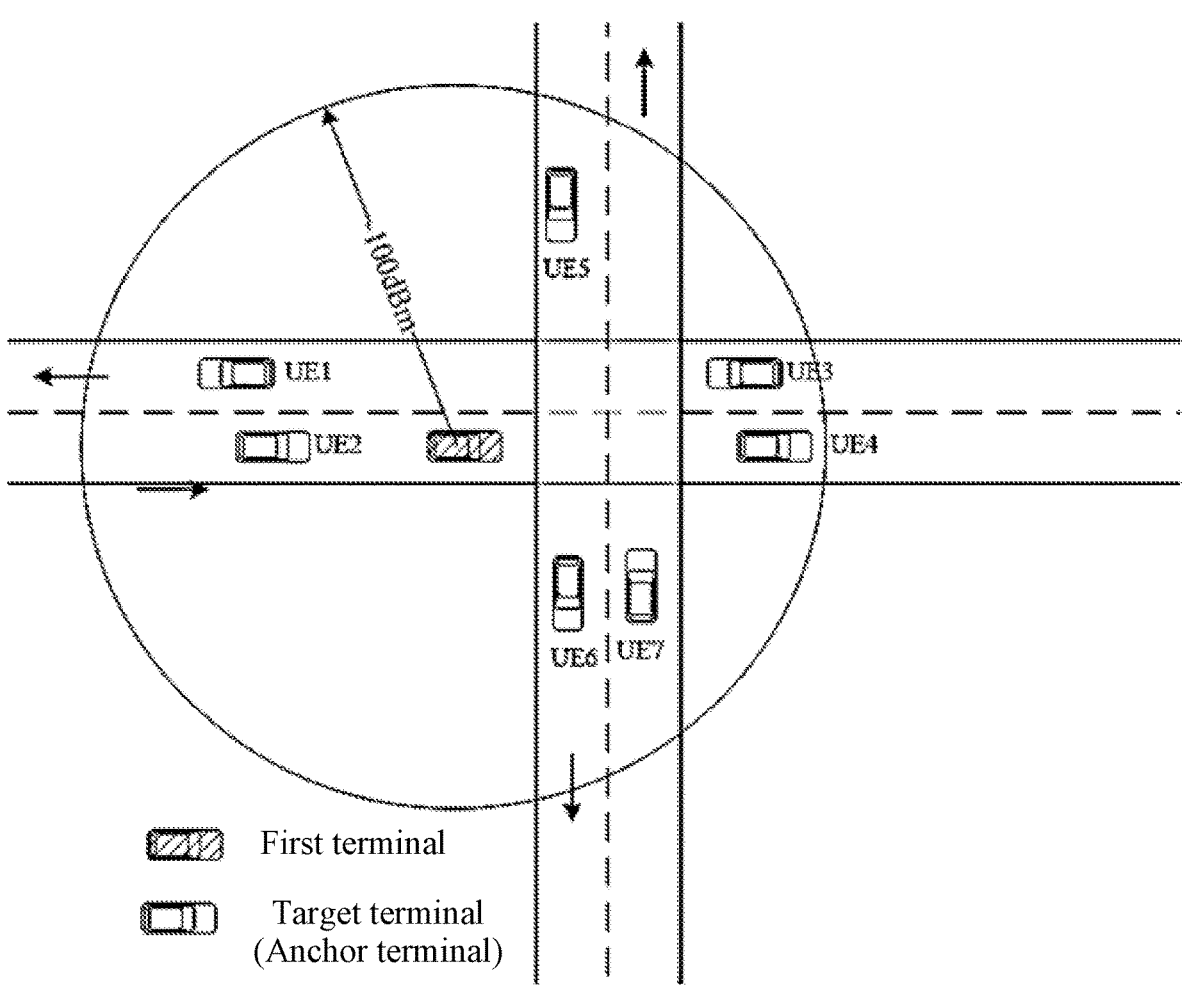
FIG. 3B is a diagram illustrating that the number of anchor UEs within a reference signal received power range is determined according to an embodiment.

FIG. 3B is a diagram illustrating that the number of anchor UEs within a reference signal received power range is determined according to an embodiment. As shown in FIG. 3B, the first terminal detects target terminals that satisfy the following conditions: The RSRP of the reference signal received by the first terminal from the target terminal does not exceed −100 dBm; and the first included angle α between the movement direction of the first terminal and the movement direction of the target terminal satisfies that mod (α, π/2)≤15. The first terminal detects that the target terminals satisfying the preceding two conditions are UE1, UE2, UE3, and UE4, and the number of these UEs is smaller than the number threshold of anchor UEs, that is, 5. Therefore, the first terminal determines that the target parameter satisfies the set restriction condition, thereby the first terminal becomes an anchor UE to send the positioning-related information.

Example three (The target terminal is a second terminal, and the second terminal sends positioning request information to request the first terminal to become the anchor UE.)

Figure 4:
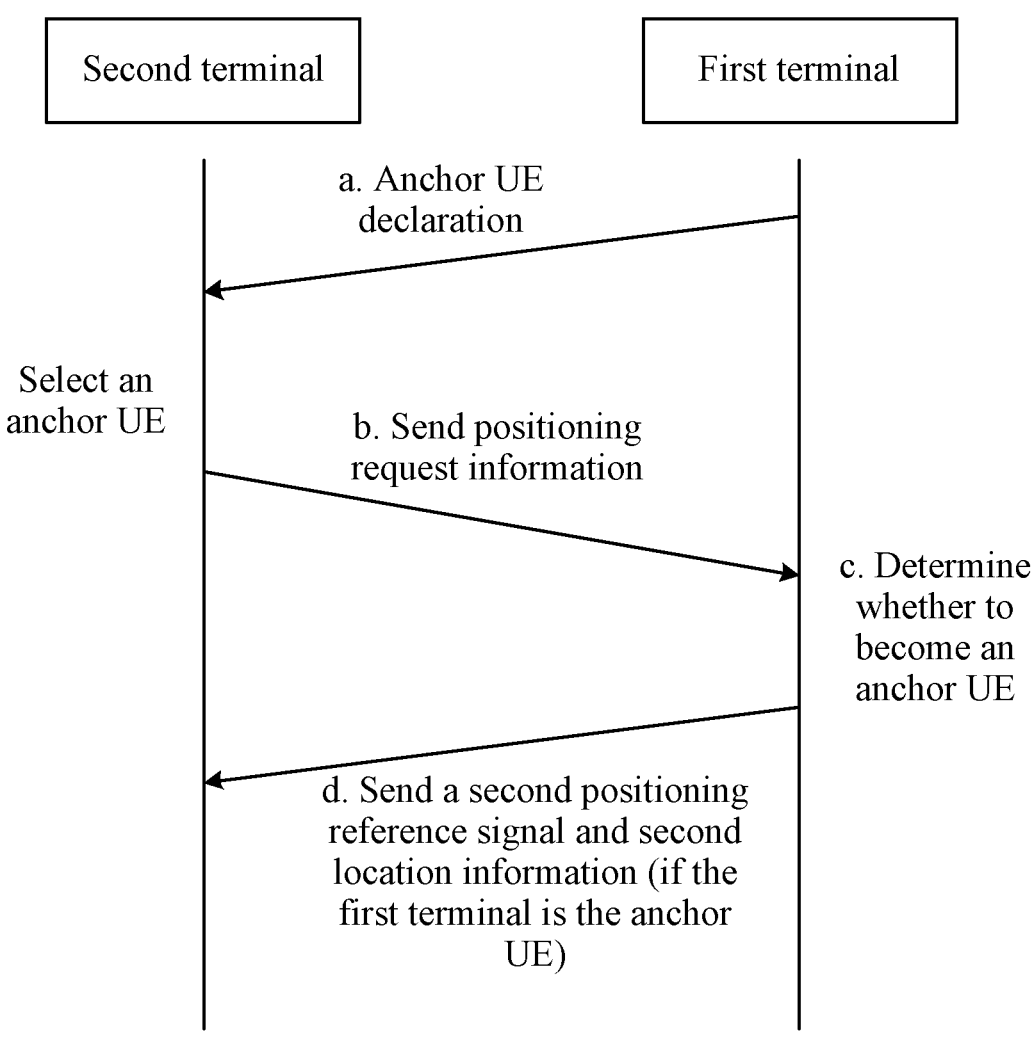
FIG. 4 is a diagram illustrating that a second terminal requests a first terminal to be an anchor terminal according to an embodiment.

FIG. 4 is a diagram illustrating that the second terminal requests the first terminal to be an anchor terminal according to an embodiment. As shown in FIG. 4, the first terminal sends second SCI. The second SCI includes anchor declaration information used for indicating that the first terminal may or is willing to become an anchor UE. The second terminal receives the anchor declaration information of one or more terminals and selects one or more terminals as the first terminal among the multiple found terminals declaring that these multiple terminals are willing to be anchor UEs. After selecting the first terminal, the second terminal sends the first SCI to the first terminal. The first SCI includes positioning request information for requesting the first terminal to be an anchor UE so as to send the positioning-related information. For example, the positioning-related information includes a second positioning reference signal and the second location information. The first terminal receives the positioning request information of the second terminal, and based on the received positioning request information, determines whether the first terminal itself becomes an anchor UE. As shown in FIG. 4, the procedures are as follows:

In operation a, the first terminal sends anchor declaration information indicated by bits in the first SCI. The first SCI is transmitted through the PSCCH or the PSSCH. In this example, the first terminal may also send a time limit that it may or is willing to be an anchor UE. For example, at moment t1, the first terminal notifies that the length of time for which it is willing to be an anchor UE is L. Then, the start time of the effective time when the first terminal is willing to be the anchor UE is t1, and the end time is t1+L−1. During the time period from t1 to t1+L−1, the first terminal is willing to be the anchor UE and transmit positioning-related information for non-first terminals.

In operation b, the second terminal selects the anchor UE according to the anchor declaration information of non-second terminals and target parameters of the non-second terminals. If the first terminal is selected, the second terminal sends positioning request information to the first terminal.

In this example, the second terminal may find a UE that satisfies the following conditions:

The distance between the second terminal and the UE does not exceed the threshold of the distance; a remainder mod ($\alpha$, 90) of an included angel between the movement direction of the second terminal and the movement direction of the UE divided by 90 does not exceed the threshold of the remainder of the included angle divided by 90; and the UE is an anchor UE.

The second terminal selects N (N is a positive integer) UEs satisfying the preceding conditions, aiming to calculate the location information of the second terminal by receiving the positioning-related information sent by these UEs. If the number M of UEs satisfying the preceding conditions is smaller than N, the second terminal still needs to select additional (N−M) terminals and send positioning request information to the (N−M) terminals so that the (N−M) terminals are also upgraded to anchor UEs.

If M is smaller than N, the second terminal may select (N−M) target terminals satisfying the following conditions as anchor UEs:

The distance between the second terminal and a UE does not exceed the threshold of the distance; mod ($\alpha$, 90) does not exceed the threshold of the remainder of the movement-direction included angle divided by 90; and the second terminal, by receiving the SCI of the UE, finds that this UE declares that the UE may or is willing to be an anchor UE.

The second terminal selects (N−M) UEs as the anchor UEs, determines UE IDs of the (N−M) UEs by receiving the SCI of the (N−M) UEs, and then sends positioning request information to the (N−M) UEs. The (N−M) UEs include a first terminal. The first SCI including the positioning request information is sent by using a specific SCI format. Through the first SCI, the second terminal indicates the UE IDs of one or more anchor UEs and the positioning request information such as a time window.

In operation c, the first terminal receives the positioning request information sent by the second terminal and determines whether the positioning request information is sent to the first terminal itself. If the UE ID of the first terminal is the same as at least one of the UE IDs contained in the positioning request information sent by the second terminal, the first terminal determines that the positioning request information is sent to itself and thus becomes the anchor UE.

In operation d, the first terminal serving as the anchor UE sends positioning-related information (including a second positioning reference signal and second location information), and the time for sending the positioning-related information belongs to the time window notified in the positioning request information of the second terminal.

Example four (The second terminal indicates the set value range of the target parameter, and if the target parameter belongs to the set value range, the first terminal determines itself as an anchor UE.)

Figure 5:
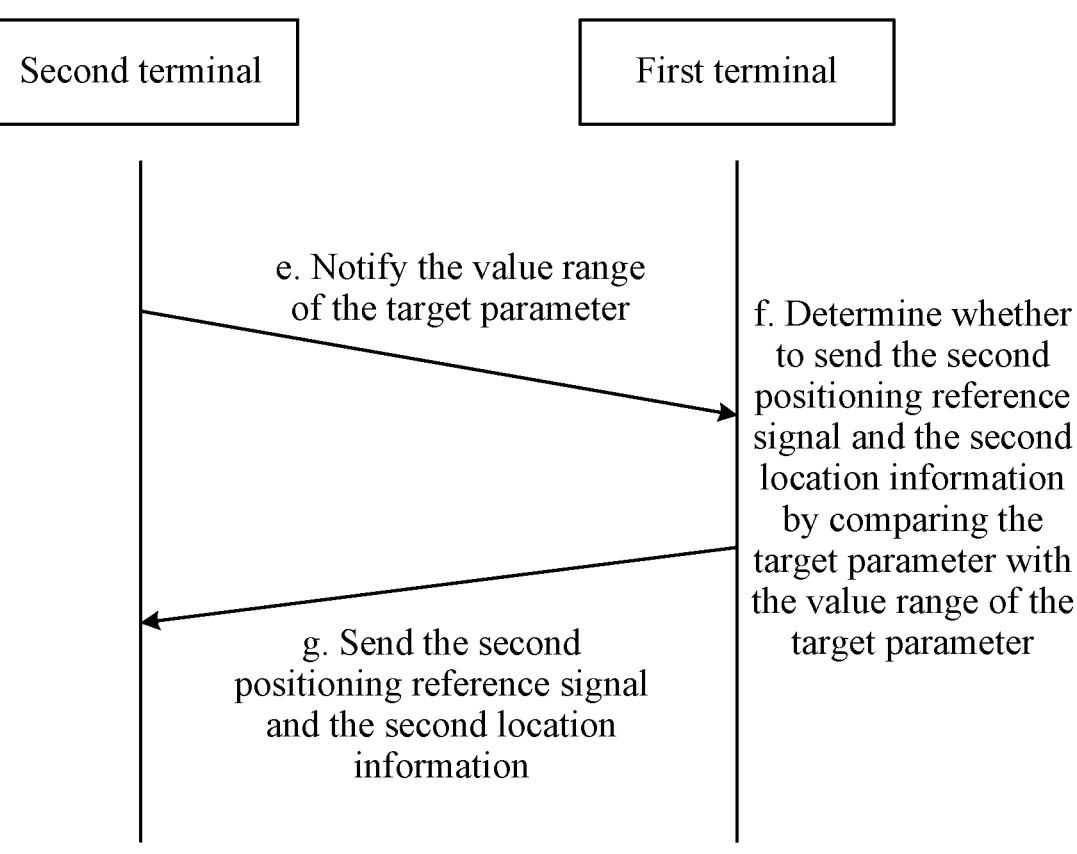
FIG. 5 is a diagram illustrating that a first terminal autonomously determines an anchor terminal according to another embodiment.

FIG. 5 is a diagram illustrating that a first terminal autonomously determines an anchor terminal according to another embodiment. As shown in FIG. 5, the second terminal notifies the first terminal of the value range of the target parameter, and according to whether the target parameter satisfies the value range, the first terminal determines whether the first terminal becomes an anchor UE. This process includes the following:

The second terminal first determines whether it is necessary to notify the value range of the target parameter. If the second terminal finds that the number M of anchor UEs satisfying the restriction condition is greater than or equal to the number threshold N, notification is not performed; otherwise, the second terminal notifies the first terminal of the value range of the target parameter. An anchor UE satisfying the restriction condition includes a UE satisfying the following conditions:

The distance between the second terminal and the UE does not exceed the threshold of the distance, and the threshold of the distance is a parameter configured by a higher layer, for example, 300 m; the included angle $\alpha$ between the movement direction of the second terminal and the movement direction of the UE satisfies that mod ($\alpha$, 90) is smaller than the threshold of the movement-direction included angle, and the threshold of the movement-direction included angle is a parameter configured by a higher layer, for example, the threshold is 15.

In operation e, the second terminal determines that it is necessary to notify the value range of the target parameter and then sends the value range of the target parameter to the first terminal. In this example, the value range is represented by the threshold. The value range of the target parameter notified by the second terminal includes the following: The threshold of the distance is 300 m, and the threshold of the movement-direction included angle (that is, the first included angle) is 15°.

In operation f, the first terminal compares the target parameter with the value range of the target parameter notified by the second terminal.

The first terminal determines the target parameter in the following manner:

The first terminal first sends a positioning reference signal to the target terminal, receives a first positioning reference signal sent by the target terminal, and then calculates a time difference between sending the positioning reference signal and receiving the first positioning reference signal, that is, $\alpha t_1$. For the target terminal, the target terminal first receives the positioning reference signal sent by the first terminal, sends the first positioning reference signal to the first terminal, and then calculates the time difference between receiving the positioning reference signal and sending the first positioning reference signal, that is $\Delta t_1$. The target terminal notifies the first terminal of $\Delta t_1$. The first terminal calculates an air propagation delay of the positioning reference signals, that is, $$\frac{\Delta t_2 - \Delta t_1}{2}.$$

Thus, the first terminal calculates the distance between the first terminal and the target terminal, that is, $$\frac{\Delta t_2 - \Delta t_1}{2} \cdot C,$$

where C denotes the speed of light.

The first terminal, by receiving the first SCI of the target terminal, acquires the movement direction of the target terminal indicated by the target terminal through the first SCI and calculates the first included angle $\alpha$ based on the movement direction of the target terminal and the movement direction of the first terminal.

The first terminal compares the target parameter with the value range of the target parameter. If the target parameter satisfies the following conditions, the first terminal determines itself as an anchor UE:

$$\frac{\Delta t_2 - \Delta t_1}{2} \cdot C$$

is less than or equal to 300 m; and mod ($\alpha$, 90) is less than or equal to 15°.

In operation g, the first terminal serving as the anchor UE sends positioning-related information, and the time for sending the positioning-related information is restricted to the time window notified in the positioning request information of the second terminal.

Example five (The first terminal determines whether the first terminal is a candidate anchor UE according to the first restriction condition and then determines whether the first terminal is an anchor UE according to the second restriction condition.)

Figure 6:
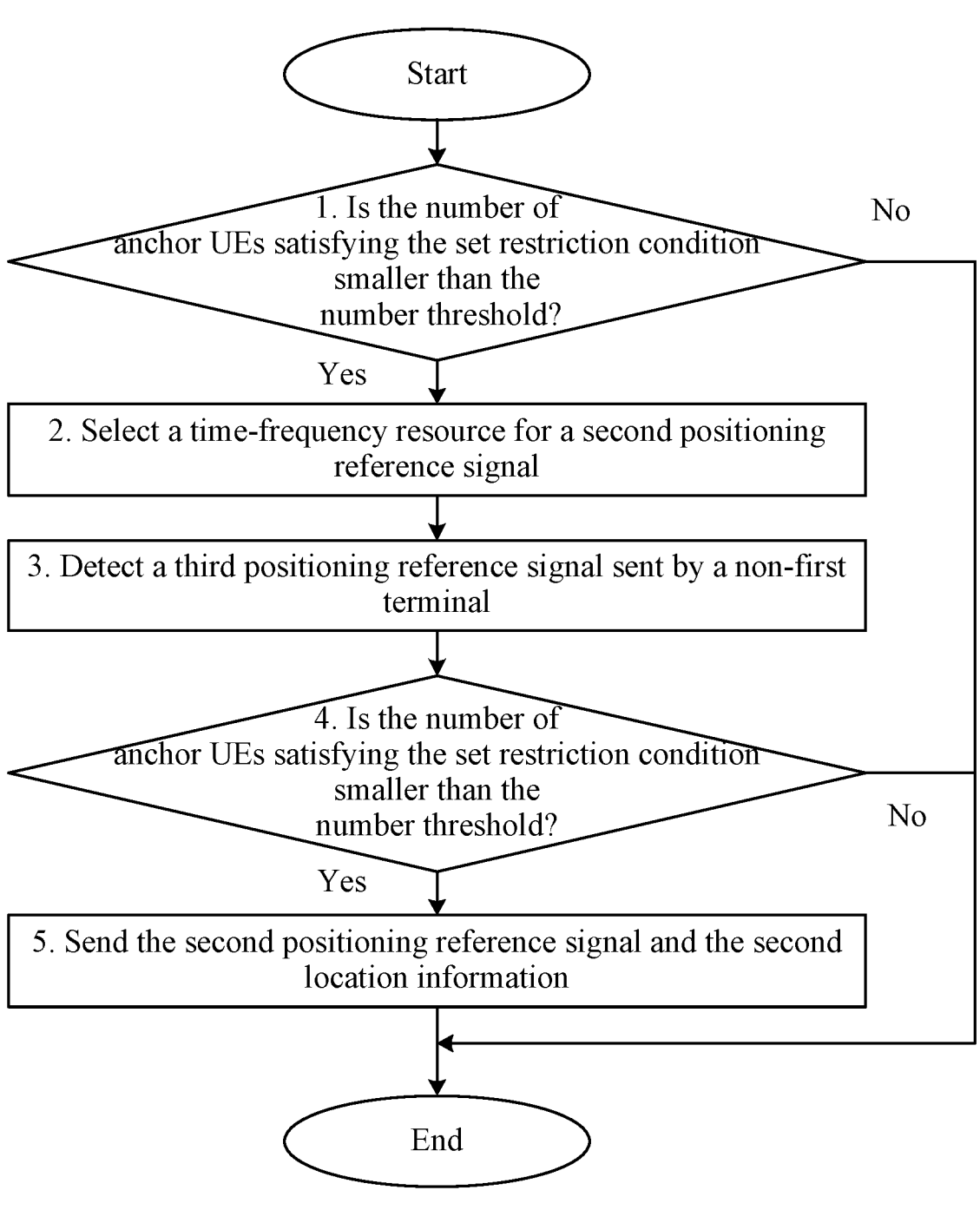
FIG. 6 is a diagram illustrating that a first terminal autonomously determines an anchor terminal according to another embodiment.

FIG. 6 is a diagram illustrating that a first terminal autonomously determines an anchor terminal according to another embodiment. As shown in FIG. 6, by comparing whether the target parameter satisfies the first restriction condition, the first terminal determines whether the first terminal is a candidate anchor UE; if the first terminal is the candidate anchor UE, a time-frequency resource is selected for a second positioning reference signal, and by detecting whether a third positioning reference signal sent by a non-first terminal satisfies the second restriction condition, it is determined whether the first terminal is an anchor UE. Determining whether the first terminal is the candidate anchor UE includes determining that the first terminal is the candidate anchor UE if the number of anchor UEs whose target parameters satisfy the set restriction condition is smaller than the number threshold. An example is described below.

The second terminal first determines whether it is necessary to notify the value range of the target parameter. If the second terminal finds that the number M of anchor UEs satisfying the restriction condition is greater than or equal to the number threshold N, notification is not performed; otherwise, the second terminal notifies the first terminal of the value range of the target parameter. An anchor UE satisfying the restriction condition includes a UE satisfying the following conditions:

The distance between the second terminal and the UE does not exceed the threshold of the distance that is a parameter configured by a higher layer, for example, 300 m; the included angle $\alpha$ between the movement direction of the second terminal and the movement direction of the UE satisfies that mod ($\alpha$, 90) is smaller than the threshold of the movement-direction included angle, and the threshold of the movement-direction included angle is a parameter configured by a higher layer, for example, the threshold is 15.

The second terminal determines that it is necessary to notify the value range of the target parameter and then sends the value range of the target parameter to the first terminal. In this example, the value range is represented by the threshold. The value range of the target parameter notified by the second terminal includes the following: The threshold of the distance is 300 m; and the threshold of the movement-direction included angle (that is, the first included angle) is 15°.

In operation 1, the first terminal compares the target parameter with the value range of the target parameter. If the target parameter satisfies the following conditions, the first terminal determines itself as a candidate anchor UE:

$$\frac{\Delta t_2 - \Delta t_1}{2} \cdot C$$

is less than or equal to 300 m; and mod ($\alpha$, 90) is less than or equal to 15°.

In operation 2, if the first terminal determines that the first terminal is the candidate anchor UE, the first terminal selects a time-frequency resource, and the location of the selected time-frequency resource is used for sending the positioning-related information (for example, a second positioning reference signal and second location information).

In operation 3, after selecting the time-frequency resource, the first terminal determines whether to use the time-frequency resource to send the positioning-related information. If the first terminal determines that the time-frequency resource is not used to send the positioning-related information, it means that the first terminal cancels sending of the positioning-related information. The first terminal finally determines whether to send the positioning-related information by detecting the third positioning reference signal sent by the non-first terminal.

In operation 4, if the first terminal detects, by detecting the third positioning reference signal, that the number of anchor UEs satisfying the following conditions is smaller than the threshold N, the first terminal finally sends the positioning-related information:

The distance between the first terminal and an anchor UE is less than or equal to 300 m; and the included angle between the movement direction of the first terminal and the movement direction of the UE is smaller than or equal to the threshold (a parameter configured by a higher layer, for example, 15°) of the first included angle.

Otherwise, the first terminal cancels the sending of the positioning-related information.

In operation 5, the first terminal serving as the anchor UE sends the positioning-related information by using the selected time-frequency resource.

Figure 7A:
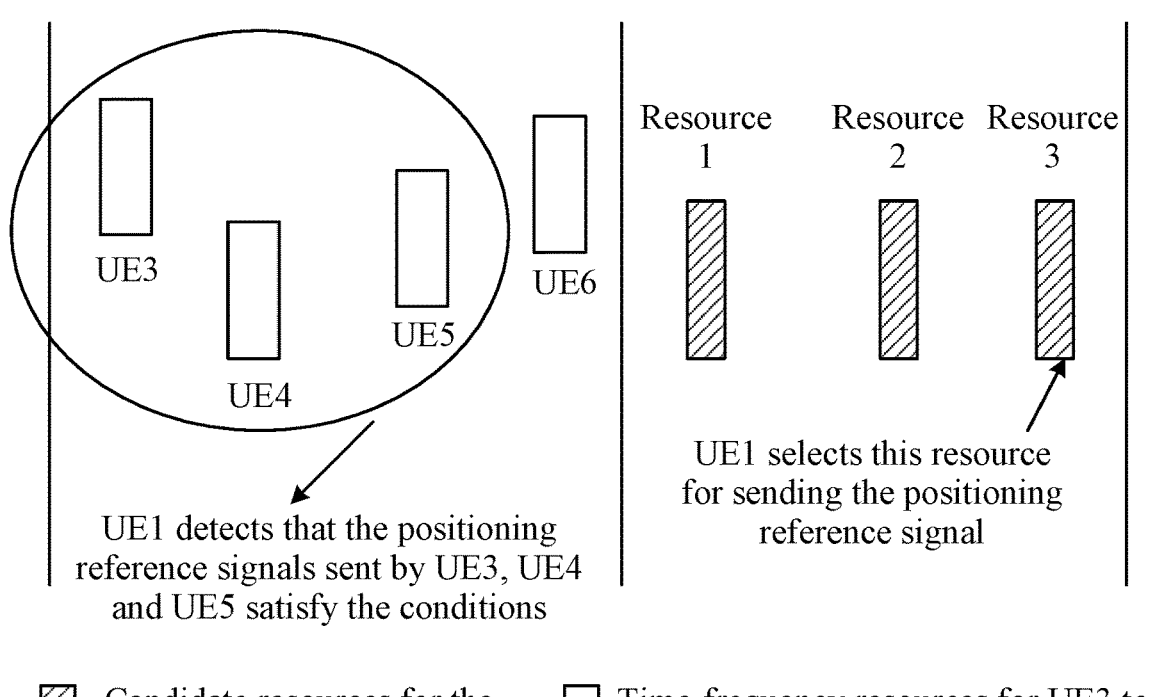
FIG. 7A is a diagram illustrating that a first terminal selects a time-frequency resource of a positioning reference signal according to an embodiment.

FIG. 7A is a diagram illustrating that a first terminal selects a time-frequency resource of a positioning reference signal according to an embodiment. As shown in FIG. 7A, the first terminal is UE1 (not shown in the figure), and by receiving positioning reference signals and SCI (SCI corresponds to the time-frequency resource, not shown in the figure) of other terminals, UE1 acquires movement directions of UE3, UE4, UE5 and UE6 and distances between UE1 and each one of UE3, UE4, UE5, or UE6. UE1 calculates the included angle between the movement direction of UE1 and the movement direction of UE (i=3, 4, 5, or 6). Moreover, UE1 seeks an anchor UE that satisfies the following conditions: The distance between UE1 and UE$_i$ is less than or equal to 300 m; and the first included angle α between the movement direction of UE1 and the movement direction of UE satisfies that mod (α, 90) is less than or equal to 15°. It is assumed that anchor UEs satisfying the preceding conditions and found by UE1 are UE3, UE4, and UE5, that is, UE1 finds M1 (M1=3) anchor UEs satisfying the preceding conditions, and it is assumed that N=4. Since M1<N, UE1 determines itself as a candidate anchor UE and needs to select a time-frequency resource for sending a second positioning reference signal. The time-frequency resources selectable by UE1 include resource 1, resource 2, and resource 3. UE1 randomly selects a resource from three candidate resource locations, for example, resource 3 is selected. The selected resource 3 may be used for transmitting the second location information in addition to transmitting the second positioning reference signal.

Figure 7B:
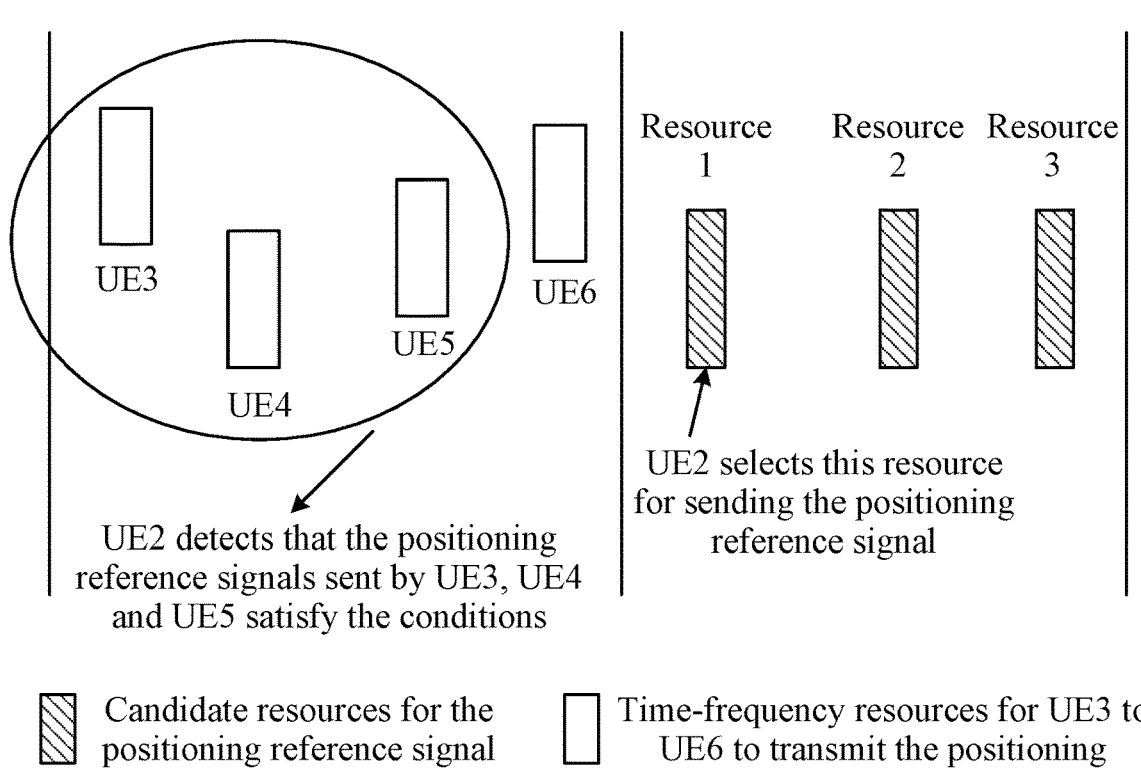
FIG. 7B is a diagram illustrating that a first terminal selects a time-frequency resource of a positioning reference signal according to another embodiment.

FIG. 7B is a diagram illustrating that a first terminal selects a time-frequency resource of a positioning reference signal according to another embodiment. In FIG. 7B, similarly, the first terminal is UE2 (not shown in the figure), anchor UEs satisfying the set restriction conditions and found by UE2 are UE3, UE4 and UE5, and the number M1' of anchor UEs satisfying the conditions equals 3, and it is assumed that N=4. Since M1'<N, UE2 triggers the resource selection process and selects resource 1 for sending the second positioning reference signal. Resource 1 selected by UE2 may be used for transmitting the second location information in addition to transmitting the second positioning reference signal.

On the basis of FIGS. 7A and 7B, the first terminal (UE1 and UE2) serving as the candidate anchor UE, after selecting the time-frequency resource for the second positioning reference signal, determines whether to cancel the sending of the second positioning reference signal. If the number of anchor UEs satisfying the set restriction conditions and detected again by the first terminal within a period of time before sending of the second positioning reference signal is greater than or equal to N, the candidate anchor UE cannot be served as anchor UE, and the sending of the second positioning reference signal is canceled.

For example, before sending the second positioning reference signal, UE2 finds that the anchor UEs satisfying the following conditions are UE3, UE4, and UE5: The distance between UE2 and UE is less than or equal to 300 m; and the first included angle α between the movement direction of UE2 and the movement direction of UE satisfies that mod (α, 90) is less than or equal to 15°. That is, M2'=3, and M2' is smaller than N. Then UE2 does not cancel the sending of the second positioning reference signal, and UE2 serving as the anchor UE sends the second positioning reference signal on resource 1.

For UE1, before sending the second positioning reference signal, UE1 finds that the anchor UEs satisfying the following conditions are UE2, UE3, UE4, and UE5: The distance between UE1 and UE$_i$ is less than or equal to 300 m; and the first included angle α between the movement direction of UE1 and the movement direction of UE satisfies that mod (α, 90) is less than or equal to 15°. That is, M2=4 and M2=N. Then UE1 cancels transmission of the second positioning reference signal, and UE1 is not the anchor UE and does not transmit the second positioning reference signal on resource 3.

The first terminal first determines whether to send the second positioning reference signal, if the first terminal determines to send the second positioning reference signal, the sending of the second positioning reference signal is performed. In FIG. 7A, based on the determination result, UE2 sends the second positioning reference signal. In FIG. 7B, based on the determination result, UE1 does not send the second positioning reference signal.

The second terminal receives the second positioning reference signals and the second location information sent from UE3, UE4, UE5, and UE2, and based on the preceding information, the second terminal calculates the location information of itself.

Example six (The first terminal determines, according to the first restriction condition, whether the first terminal is a candidate anchor UE and then determines, according to the second restriction condition, whether the first terminal is an anchor UE.)

Figure 8:
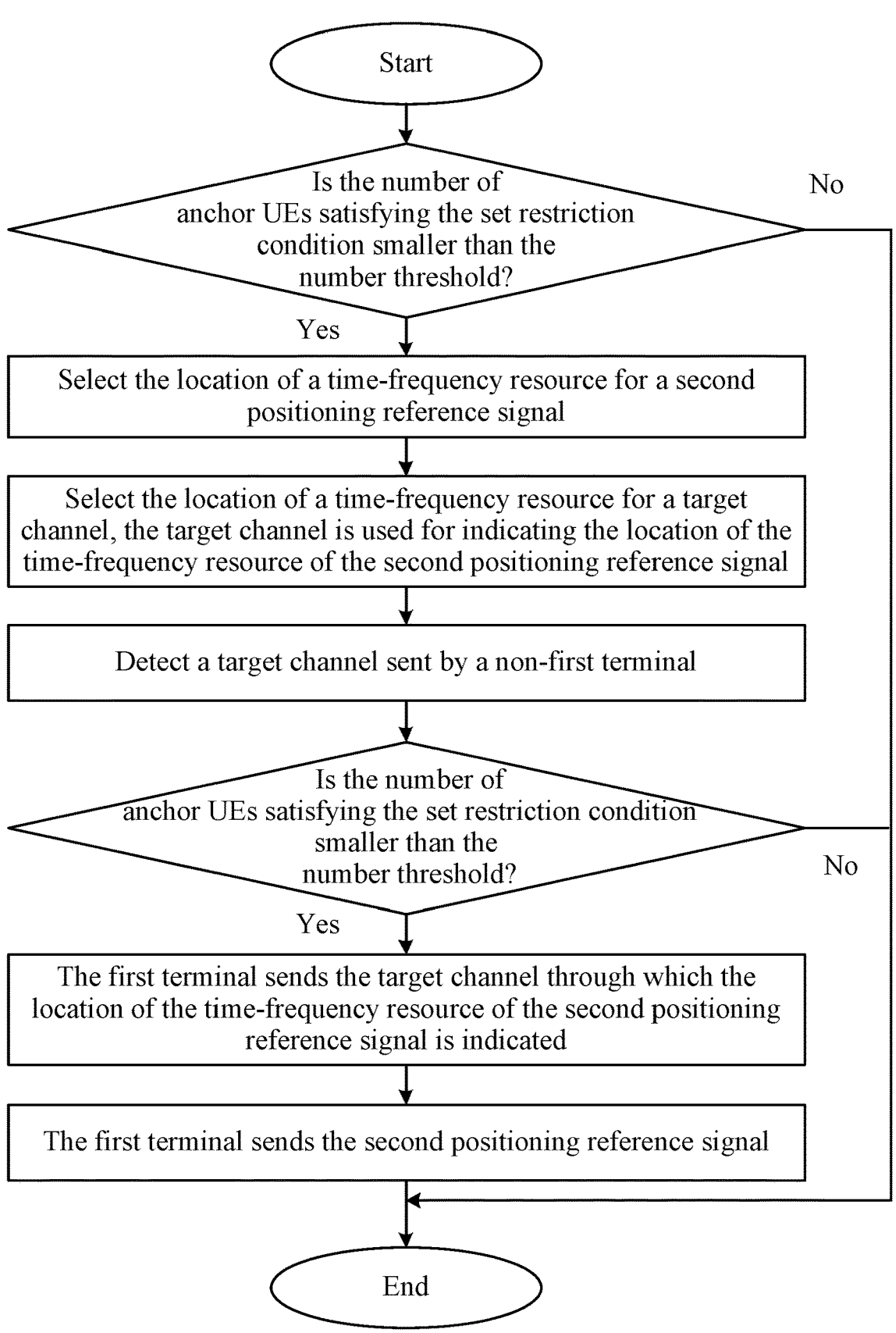
FIG. 8 is a diagram illustrating that a first terminal autonomously determines an anchor terminal according to another embodiment.

FIG. 8 is a diagram illustrating that a first terminal autonomously determines an anchor terminal according to another embodiment. As shown in FIG. 8, by comparing whether the target parameter satisfies the first restriction condition, the first terminal determines whether the first terminal is a candidate anchor UE; if the first terminal is the candidate anchor UE, time-frequency resources are selected for a target channel and a second positioning reference signal, and by detecting whether a third positioning reference signal sent by a non-first terminal satisfies the second restriction condition, it is determined whether the first terminal is an anchor UE. Determining whether the first terminal is the candidate anchor UE includes determining the first terminal as the candidate anchor UE if the number of anchor UEs whose target parameters satisfy the set restriction condition is smaller than the number threshold. An example is described below.

The second terminal first determines whether it is necessary to notify the value range of the target parameter. If the second terminal finds that the number M of anchor UEs satisfying the restriction condition is greater than or equal to the number threshold N, notification is not performed; otherwise, the second terminal notifies the first terminal of the value range of the target parameter. An anchor UE satisfying the restriction condition includes a UE satisfying the following conditions:

The distance between the second terminal and this UE does not exceed the threshold of the distance that is a parameter configured by a higher layer, for example, 300 m; the included angle α between the movement direction of the second terminal and the movement direction of the UE satisfies that mod (α, 90) is smaller than the threshold of the movement-direction included angle, and the threshold of the movement-direction included angle is a parameter configured by a higher layer, for example, the threshold is 15.

The second terminal determines that it is necessary to notify the value range of the target parameter and then sends the value range of the target parameter to the first terminal. In this example, the value range is represented by the threshold. The value range of the target parameter notified by the second terminal includes the following: The threshold of the distance is 300 m; and the threshold of the movement-direction included angle (that is, the first included angle) is 15°.

The first terminal compares the target parameter with the value range of the target parameter. If the target parameter satisfies the following conditions, the first terminal determines itself as a candidate anchor UE:

$$\frac{\Delta t_2 - \Delta t_1}{2} \cdot C$$

is less than or equal to 300 m; and mod ($\alpha$, 90) is less than or equal to 15°.

If the first terminal determines itself as the candidate anchor UE, the first terminal selects a time-frequency resource for the target channel and a time-frequency resource for sending the positioning-related information (including a second positioning reference signal and second location information). The target channel is configured to indicate a time-frequency resource of the second positioning reference signal. As a candidate anchor UE, the first terminal detects a target channel sent by a non-first terminal before sending the target channel and determines whether to cancel the sending of the target channel of the first terminal based on the detection result.

After selecting the time-frequency resource, the first terminal determines whether to finally use the time-frequency resource for sending the target channel and the positioning-related information. If the first terminal determines to not use the time-frequency resource for sending the target channel, it means that the first terminal cancels the sending of the target channel. Before sending the target channel through the selected time-frequency resource, the first terminal attempts to receive the target channel used for indicating the location of the time-frequency resource of the third positioning reference signal and sent by the non-first terminal. If it is found that the number of anchor UEs satisfying the conditions is greater than or equal to the threshold, the first terminal cancels the transmission of the target channel.

If the first terminal detects, by detecting the target channel, that the number of anchor UEs satisfying the following conditions is smaller than the threshold N, the first terminal finally sends the target channel and also sends the second positioning reference signal on the time-frequency resource indicated by the target channel:

The distance between the first terminal and an anchor UE is less than or equal to 300 m; and the included angle between the movement direction of the first terminal and the movement direction of the UE is smaller than or equal to the threshold (a parameter configured by a higher layer, for example, the threshold is 15°) of the first included angle.

Otherwise, the first terminal cancels the sending of the target channel.

The first terminal serving as the anchor UE sends the target channel by using the selected time-frequency resource.

Figure 9A:
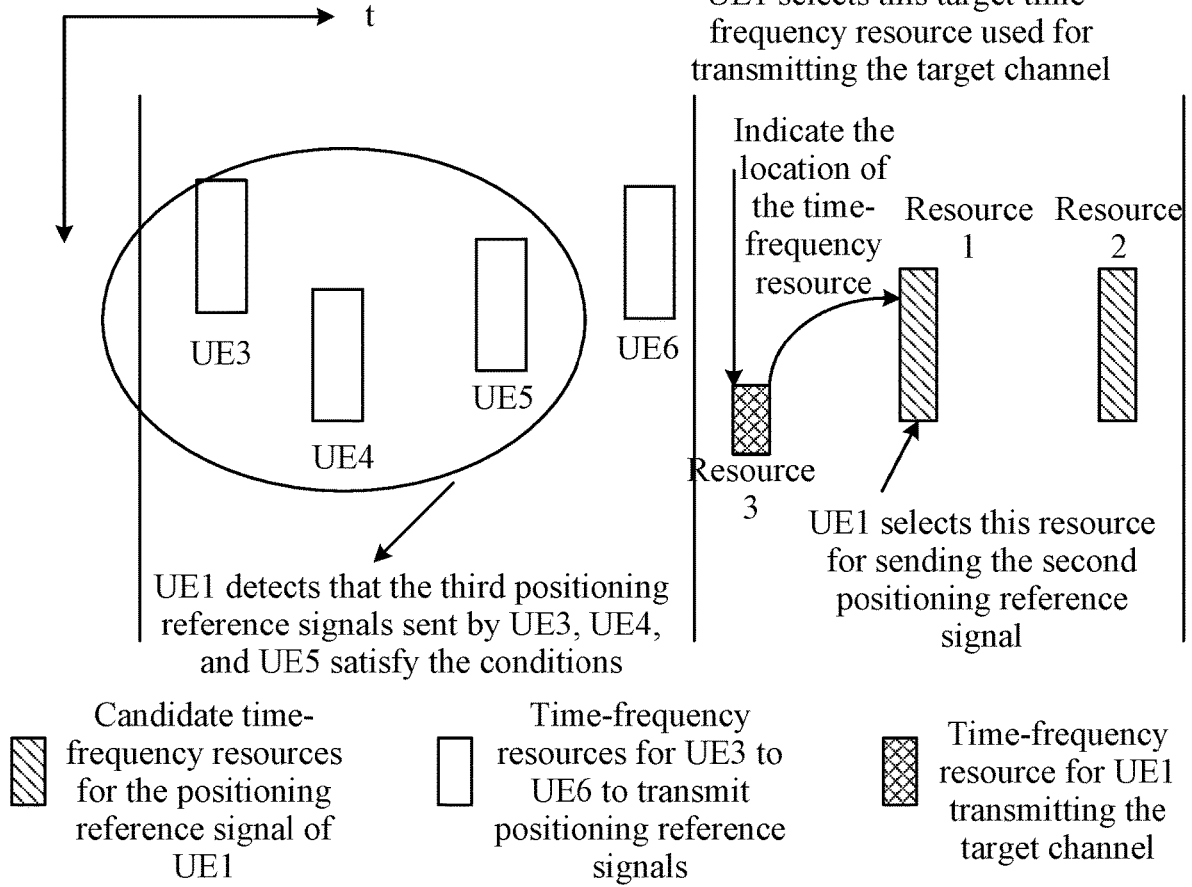
FIG. 9A is a diagram illustrating that a first terminal selects a time-frequency resource of a target channel and a time-frequency resource of a positioning reference signal according to an embodiment.

FIG. 9A is a diagram illustrating that a first terminal selects a time-frequency resource of a target channel and a time-frequency resource of a positioning reference signal according to an embodiment. As shown in FIG. 9A, the first terminal is UE1 (not shown in the figure), and by receiving positioning reference signals and SCI (SCI corresponds to the time-frequency resource, not shown in the figure) of other terminals, UE1 acquires movement directions of UE3, UE4, UE5 and UE6 and distances between UE1 and each one of UE3, UE4, UE5, or UE6. UE1 calculates the included angle between the movement direction of UE1 and the movement direction of UE (i=3, 4, 5, or 6). Moreover, UE1 seeks an anchor UE that satisfies the following conditions: The distance between UE1 and UE$_i$ is less than or equal to 300 m; and the first included angle $\alpha$ between the movement direction of UE1 and the movement direction of UE satisfies that mod ($\alpha$, 90) is less than or equal to 15°. It is assumed that anchor UEs satisfying the preceding conditions and found by UE1 are UE3, UE4 and UE5, that is, UE1 finds M1 (M1=3) anchor UEs satisfying the preceding conditions, and it is assumed that N=4. Since M1<N, UE1 determines itself as a candidate anchor UE and selects the time-frequency resources for the target channel and the second positioning reference signal separately. The target channel is used for indicating the location of the time-frequency resource of the second positioning reference signal. In FIG. 9A, the time-frequency resource selected by UE1 for the target channel is resource 3, and the time-frequency resource selected for the second positioning reference signal is resource 1.

Figure 9B:
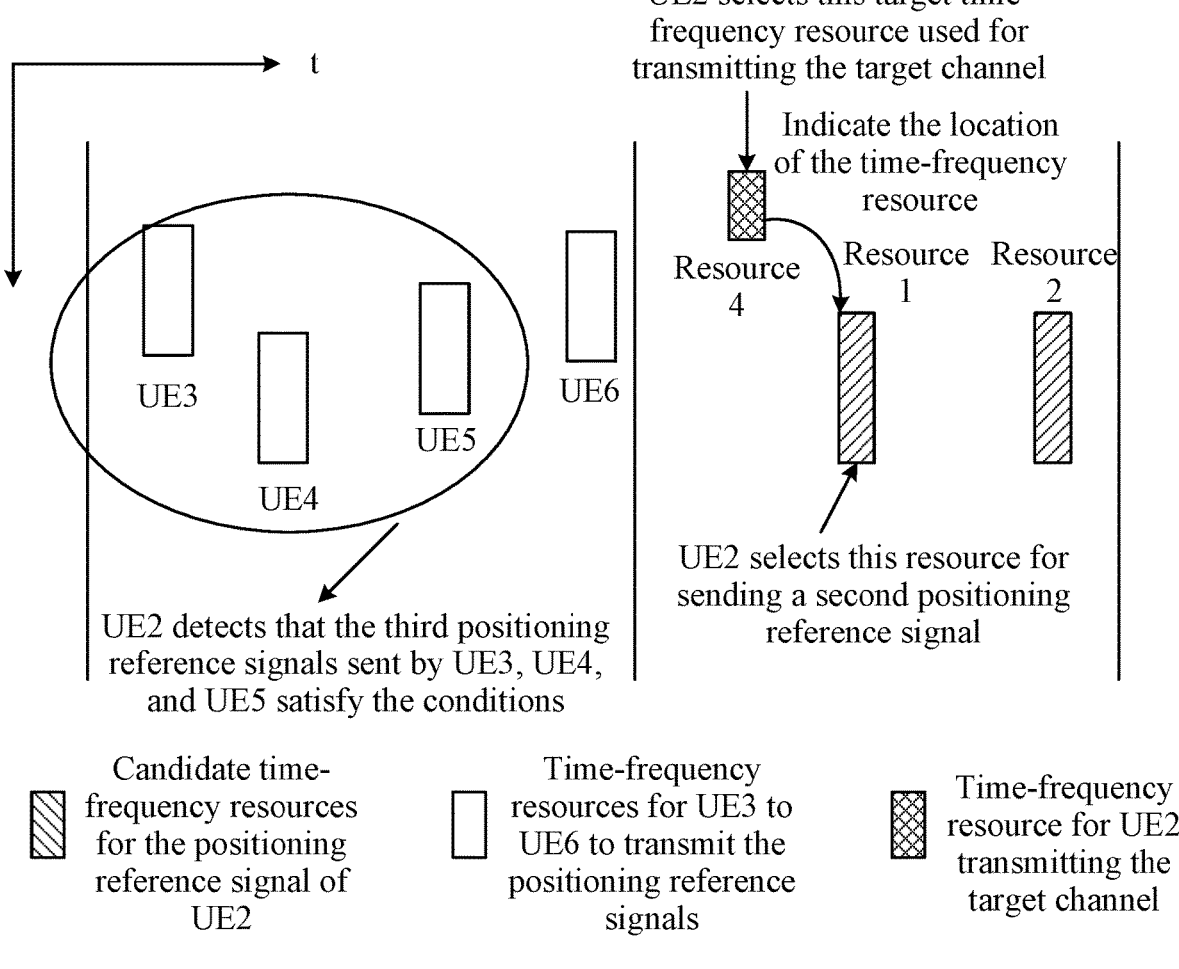
FIG. 9B is a diagram illustrating that a first terminal selects a time-frequency resource of a target channel and a time-frequency resource of a positioning reference signal according to another embodiment.

FIG. 9B is a diagram illustrating that a first terminal selects a time-frequency resource of a target channel and a time-frequency resource of a positioning reference signal according to another embodiment. In FIG. 9B, similarly, the first terminal is UE2 (not shown in the figure), anchor UEs satisfying the set restriction conditions and found by UE2 are UE3, UE4 and UE5, and the number M1' of the anchor UEs satisfying the conditions equals 3, and it is assumed that N=4. Since M1'<N, UE2 triggers the resource selection process and selects time-frequency resources for the target channel and the second positioning reference signal separately. The target channel is used to indicate the location of the time-frequency resource of the second positioning reference signal. In FIG. 9B, the time-frequency resource selected by UE2 for the target channel is resource 4, and the time-frequency resource selected for the second positioning reference signal is resource 1.

On the basis of FIGS. 9A and 9B, the first terminal (UE1 and UE2) serving as the candidate anchor UE, after selecting the time-frequency resources for the target channel and the second positioning reference signal, determines whether to cancel the transmission of the target channel. If the number of anchor UEs satisfying the set restriction conditions and detected again by the first terminal within a period of time before sending of the second positioning reference signal is greater than or equal to N, the candidate anchor UE cannot be served as the anchor UE, and the sending of the target channel is canceled.

For example, before sending the second positioning reference signal, UE1 finds that the anchor UEs satisfying the following conditions are UE3, UE4 and UE5: The distance between UE1 and UE$_i$ is less than or equal to 300 m; and the first included angle $\alpha$ between the movement direction of UE1 and the movement direction of UE$_i$ satisfies that mod ($\alpha$, 90) is less than or equal to 15°. That is, M2'=3, and M2' is smaller than N. Then UE1 does not cancel the sending of the target channel, and serving as the anchor UE, UE1 sends the target channel on resource 3 and indicates that a second positioning reference signal is sent on resource 1 by transmitting the target channel.

For UE2, before sending the second positioning reference signal, UE2 finds that the anchor UEs satisfying the following conditions are UE1, UE3, UE4 and UE5: The distance between UE2 and UE is less than or equal to 300 m; and the first included angle $\alpha$ between the movement direction of UE2 and the movement direction of UE satisfies that mod ($\alpha$, 90) is less than or equal to 15°. That is, M2=4 and M2=N. Then UE2 cancels the transmission of the target channel, and UE2 is not the anchor UE and does not transmit the target channel on resource 4 and does not transmit the positioning reference signal on resource 1.

The first terminal first determines whether to send the target channel, if the first terminal determines to send the target channel, sending of the target channel is performed. In FIG. 9A, based on the determination result, UE1 sends the target channel. In FIG. 9B, based on the determination result, UE2 does not send the target channel.

The second terminal receives the positioning-related information from UE3, UE4, UE5 and UE1 and calculates the location information of the second terminal based on the information.

This embodiment of the present application also provides an information sending method, which may be applied to a second terminal. The second terminal sends information to the first terminal for the first terminal to autonomously determine whether the first terminal may serve as an anchor UE, and the second terminal receives positioning-related information sent by the first terminal serving as the anchor UE, thereby reducing interference with other terminals that transmit positioning-related information. The second terminal in this embodiment corresponds to a target terminal of the first terminal in the preceding embodiments. For technical details not described in detail in this embodiment, reference may be made to any one of the preceding embodiments.

Figure 10:
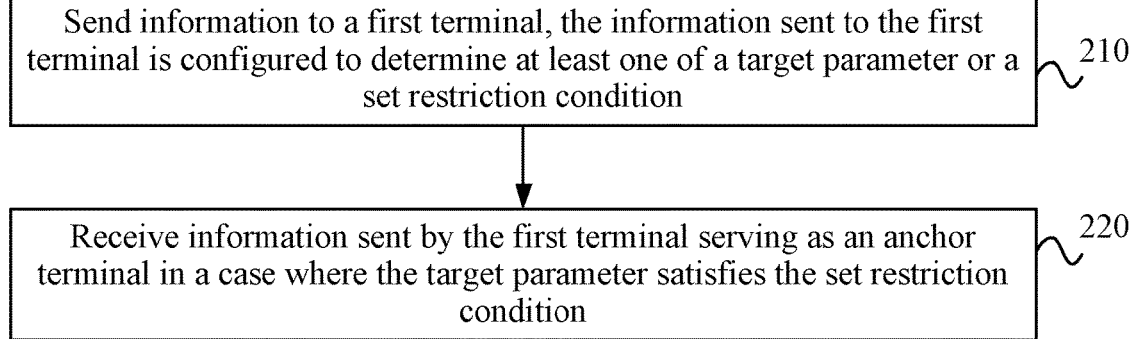
FIG. 10 is a flowchart of an information sending method according to an embodiment.

FIG. 10 is a flowchart of an information sending method according to an embodiment. As shown in FIG. 10, the method provided in this embodiment includes 210 and 220 described below.

In 210, information is sent to a first terminal, and the information sent to the first terminal is configured to determine at least one of a target parameter or a set restriction condition.

In 220, information sent by the first terminal serving as an anchor terminal is received in the case where the target parameter satisfies the set restriction condition.

In this embodiment, the information sent by the second terminal to the first terminal may be used for the first terminal to determine the target parameter and/or the set restriction condition, and the second terminal may request the first terminal serving as an anchor UE to send the positioning-related information (including a second positioning reference signal and second location information).

In an embodiment, the information sent to the first terminal includes at least one of the following: a first positioning reference signal; first sidelink control information (SCI); a first positioning reference signal and first location information; a demodulation reference signal; or a target channel.

In an embodiment, the target parameter includes at least one of the following:

the road direction indicated by the second terminal for the first terminal; a road identity indicated by the second terminal for the first terminal; the movement direction indicated by the second terminal for the first terminal; the distance between the first terminal and the target terminal; RSRP of a reference signal received by the first terminal from the target terminal; a first included angle between the movement direction of the first terminal and the movement direction of the target terminal; a remainder obtained from dividing a first included angle between the movement direction of the first terminal and the movement direction of a target terminal by 90 or $\pi/2$; a second included angle between the road direction in which the first terminal is located and the road direction in which the target terminal is located; a remainder obtained from dividing a second included angle between the road direction in which the first terminal is located and the road direction in which the target terminal is located by 90 or $\pi/2$; or a user equipment identity of the anchor terminal.

In an embodiment, the information sent to the first terminal includes the first SCI that includes the user equipment identity of the anchor terminal.

In an embodiment, the user equipment identity of the anchor terminal is a source ID of the anchor terminal.

In an embodiment, the information sent to the first terminal includes the first SCI that includes the set restriction condition, and the set restriction condition includes that the value of the target parameter does not exceed the set value range. The set value range includes at least one of the following:

the road direction in which the first terminal is located; an identity of the road in which the first terminal is located; the movement direction of the first terminal; the value range of the distance between the first terminal and the target terminal; the threshold of the distance between the first terminal and the target terminal; the value range of RSRP of a reference signal received by the first terminal from the target terminal; the threshold of RSRP of a reference signal received by the first terminal from the target terminal;

the value range of a first included angle; the threshold of a first included angle; the value range of a second included angle; the threshold of a second included angle; the value range of a remainder obtained from dividing a first included angle by 90 or $\pi/2$; the threshold of a remainder obtained from dividing a first included angle by 90 or $\pi/2$; the value range of a remainder obtained from dividing a second included angle by 90 or $\pi/2$; or the threshold of a remainder obtained from dividing a second included angle by 90 or $\pi/2$.

In an embodiment, the information sent to the first terminal includes the first SCI that includes positioning request information, and the positioning request information is configured to request the first terminal to send one of the following information: a second positioning reference signal or a second positioning reference signal and second location information.

In an embodiment, the method also includes the following:

In 230: Second SCI is received, and the second SCI is configured to indicate that the first terminal supports for being the anchor terminal.

In an embodiment, the second SCI is also configured to indicate a time limit for using the first terminal as the anchor terminal.

Figure 11:
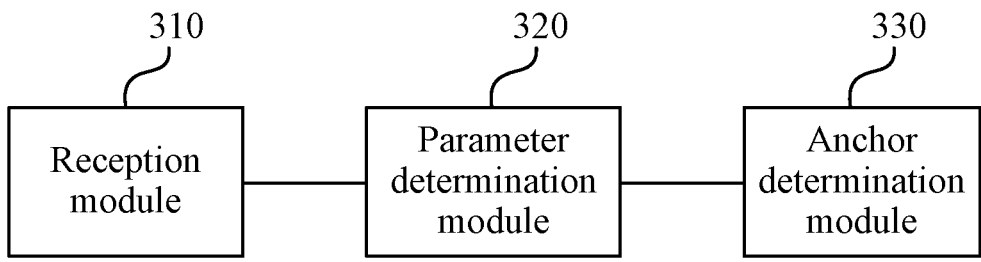
FIG. 11 is a diagram illustrating the structure of an anchor terminal determination apparatus according to an embodiment.

This embodiment of the present application also provides an anchor terminal determination apparatus. FIG. 11 is a diagram illustrating the structure of an anchor terminal determination apparatus according to an embodiment. As shown in FIG. 11, the anchor terminal determination apparatus includes a reception module 310, a parameter determination module 320, and an anchor determination module 330.

The reception module 310 is configured to receive information sent by a target terminal. The parameter determination module 320 is configured to determine a target parameter according to the information sent by the target terminal. The anchor determination module 330 is configured to determine that the first terminal is an anchor terminal in a case where the target parameter satisfies a set restriction condition.

In the anchor terminal determination apparatus provided by this embodiment, a terminal autonomously determines whether itself may serve as an anchor UE to send positioning-related information to other terminals; and when a set restriction condition is satisfied, the terminal may be used as the anchor UE, thereby reducing interference with other terminals that transmit positioning-related information.

In an embodiment, the information sent by the target terminal includes at least one of the following:

a first positioning reference signal; the first SCI; a first positioning reference signal and the first location information; a demodulation reference signal; or a target channel.

In an embodiment, the target parameter includes at least one of the following:

the road direction indicated by the target terminal for the first terminal; a road identity indicated by the target terminal for the first terminal; the movement direction indicated by the target terminal for the first terminal; the distance between the first terminal and the target terminal; RSRP of a reference signal received by the first terminal from the target terminal; a first included angle between the movement direction of the first terminal and the movement direction of the target terminal; a remainder obtained from dividing the first included angle between the movement direction of the first terminal and the movement direction of the target terminal by 90 or $\pi/2$; a second included angle between the road direction in which the first terminal is located and the road direction in which the target terminal is located; a remainder obtained from dividing the second included angle between the road direction in which the first terminal is located and the road direction in which the target terminal is located by 90 or $\pi/2$; or a user equipment identity of the anchor terminal.

In an embodiment, the set restriction condition includes that the value of the target parameter does not exceed the set value range. The set value range includes at least one of the following:

the road direction in which the first terminal is located; an identity of the road in which the first terminal is located; the movement direction of the first terminal; the value range of the distance between the first terminal and the target terminal; the threshold of the distance between the first terminal and the target terminal; the value range of RSRP of a reference signal received by the first terminal from the target terminal; the threshold of RSRP of a reference signal received by the first terminal from the target terminal; the value range of a first included angle; the threshold of a first included angle; the value range of a second included angle; the threshold of a second included angle; the value range of a remainder obtained from dividing a first included angle by 90 or $\pi/2$; the threshold of a remainder obtained from dividing a first included angle by 90 or $\pi/2$; the value range of a remainder obtained from dividing a second included angle by 90 or $\pi/2$; or the threshold of a remainder obtained from dividing a second included angle by 90 or $\pi/2$.

In an embodiment, the target parameter includes a user equipment identity of the anchor terminal, and the set restriction condition includes that a source ID of the first terminal belongs to the user equipment identity of the anchor terminal.

In an embodiment, the information sent by the target terminal includes the first SCI, and the parameter determination module 320 is configured to determine a user equipment identity of the anchor terminal according to the first SCI.

In an embodiment, the target parameter includes a user equipment identity of the anchor terminal, and the user equipment identity of the anchor terminal is a source ID of the anchor terminal.

In an embodiment, at least one target terminal is provided, and the set restriction condition includes that the number of target terminals whose corresponding target parameters satisfy the set restriction condition does not exceed the number threshold, or that the number of target terminals whose corresponding target parameters satisfy the set restriction condition is smaller than the number threshold.

In an embodiment, the target terminal includes at least one anchor terminal, and information sent by each target terminal includes a first positioning reference signal and first location information.

In an embodiment, the target terminals include at least one second terminal, the information sent by each target terminal includes the first SCI that includes positioning request information, and the positioning request information is configured to request the first terminal to send one of the following information: a second positioning reference signal, or a second positioning reference signal and second location information.

In an embodiment, the parameter determination module 320 is configured to acquire, according to the first SCI sent by the target terminal, the movement direction of the target terminal, and calculate a first included angle between the movement direction of the first terminal and the movement direction of the target terminal.

In an embodiment, the parameter determination module 320 is configured to measure the distance between the first terminal and the target terminal according to a first positioning reference signal sent by the target terminal.

In an embodiment, the parameter determination module 320 is configured to measure RSRP of a reference signal received by the first terminal from the target terminal according to a first positioning reference signal or a demodulation reference signal sent by the target terminal.

In an embodiment, an information reception module is also included in the anchor terminal determination apparatus.

The information reception module is configured to receive, through RRC signaling, indication information of the set value range of the target parameter.

In an embodiment, the set restriction condition includes a first restriction condition and a second restriction condition, and the anchor determination module 320 includes a candidate terminal determination unit and an anchor terminal determination unit.

The candidate terminal determination unit is configured to determine that the first terminal is a candidate anchor terminal in the case where the target parameter satisfies the first restriction condition. The anchor terminal determination unit is configured to determine that the first terminal is an anchor terminal in the case where the second restriction condition is satisfied.

In an embodiment, at least one target terminal is provided, and the first restriction condition includes that the number of target terminals whose corresponding target parameters satisfy the set restriction condition does not exceed the number threshold, or that the number of target terminals whose corresponding target parameters satisfy the set restriction condition is smaller than the number threshold.

In an embodiment, a first resource determination module is also included in the anchor terminal determination apparatus.

The first resource determination module is configured to determine a time-frequency resource for sending a second positioning reference signal in the case where the first terminal is determined as the candidate anchor terminal.

In an embodiment, the anchor terminal determination unit 302 is configured to detect a third positioning reference signal sent by a non-first terminal; and in the case where the detection result of the third positioning reference signal satisfies the second restriction condition, determine that the first terminal is the anchor terminal and send the second positioning reference signal, and in the case where the detection result of the third positioning reference signal does not satisfy the second restriction condition, determine that the first terminal is not the anchor terminal according to the detection result of the third positioning reference signal, and cancel sending of the second positioning reference signal; alternatively, in the case where the detection result of the third positioning reference signal does not satisfy the second restriction condition, determine that the first terminal is the anchor terminal, and send the second positioning reference signal, and in the case where the detection result of the third positioning reference signal satisfies the second restriction condition, determine that the first terminal is not the anchor terminal according to the detection result of the third positioning reference signal, and cancel sending of the second positioning reference signal.

In an embodiment, a second resource determination module is also included in the anchor terminal determination apparatus.

The second resource determination module is configured to determine a time-frequency resource of a target channel and a time-frequency resource of a second positioning reference signal in the case where the first terminal is determined as the candidate anchor terminal. The target channel is configured to indicate the time-frequency resource of the second positioning reference signal.

In an embodiment, the anchor terminal determination unit is configured to detect a target channel sent by a non-first terminal; and in the case where the detection result of the target channel satisfies the second restriction condition, determine that the first terminal is the anchor terminal and send the second positioning reference signal, and in the case where the detection result of the target channel does not satisfy the second restriction condition, determine that the first terminal is not the anchor terminal, and cancel sending of the target channel; alternatively, in the case where the detection result of the target channel does not satisfy the second restriction condition, determine that the first terminal is the anchor terminal, and send the second positioning reference signal, and in the case where the detection result of the target channel satisfies the second restriction condition, determine that the first terminal is not the anchor terminal, and cancel sending of the target channel.

In an embodiment, an SCI sending module is also included in the anchor terminal determination apparatus.

The SCI sending module is configured to send second SCI. The second SCI is configured to indicate that the first terminal supports for being the anchor terminal.

In an embodiment, the second SCI is also configured to indicate a time limit for using the first terminal as the anchor terminal.

The anchor terminal determination apparatus provided in this embodiment and the anchor terminal determination method provided in the preceding embodiments belong to the same concept. For technical details not described in detail in this embodiment, reference may be made to any one of the preceding embodiments, and this embodiment has the same effects as executing the anchor terminal determination method.

Figure 12:
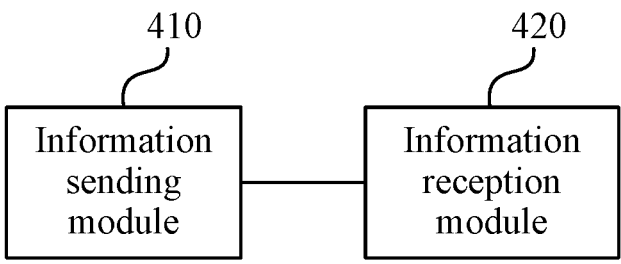
FIG. 12 is a diagram illustrating the structure of an information sending apparatus according to an embodiment.

This embodiment of the present application also provides an information sending apparatus. FIG. 12 is a diagram illustrating the structure of an information sending apparatus according to an embodiment. As shown in FIG. 12, the information sending apparatus includes an information sending module 410 and an information reception module 420.

The information sending module 410 is configured to send information to a first terminal. The information sent to the first terminal is configured to determine at least one of a target parameter or a set restriction condition. The information reception module 420 is configured to receive information sent by the first terminal as an anchor terminal in the case where the target parameter satisfies the set restriction condition.

The information sending apparatus provided by this embodiment sends information to the first terminal for the first terminal to autonomously determine whether the first terminal may serve as an anchor UE, and the information sending apparatus receives positioning-related information sent by the first terminal as the anchor UE, thereby reducing interference with other terminals that transmit positioning-related information.

In an embodiment, the information sent to the first terminal includes at least one of the following: a first positioning reference signal; first sidelink control information (SCI); a first positioning reference signal and first location information; a demodulation reference signal; or a target channel.

In an embodiment, the target parameter includes at least one of the following:

the road direction indicated by the second terminal for the first terminal; a road identity indicated by the second terminal for the first terminal; the movement direction indicated by the second terminal for the first terminal; the distance between the first terminal and the target terminal; reference signal received power (RSRP) of a reference signal received by the first terminal from the target terminal; a first included angle between the movement direction of the first terminal and the movement direction of the target terminal; a remainder obtained from dividing a first included angle between the movement direction of the first terminal and the movement direction of a target terminal by 90 or $\pi/2$; a second included angle between the road direction in which the first terminal and the road direction in which the target terminal is located; a remainder obtained from dividing a second included angle between the road direction in which the first terminal is located and the road direction in which the target terminal by 90 or $\pi/2$; or a user equipment identity of the anchor terminal.

In an embodiment, the user equipment identity of the anchor terminal is a source ID of the anchor terminal.

In an embodiment, the information sent to the first terminal includes the first SCI, the first SCI includes the set restriction condition, and the set restriction condition includes that the value of the target parameter does not exceed the set value range. The set value range includes at least one of the following:

the road direction in which the first terminal is located; an identity of the road in which the first terminal is located; the movement direction of the first terminal; the value range of the distance between the first terminal and the target terminal; the threshold of the distance between the first terminal and the target terminal; the value range of RSRP of a reference signal received by the first terminal from the target terminal; the threshold of RSRP of a reference signal received by the first terminal from the target terminal; the value range of a first included angle; the threshold of a first included angle; the value range of a second included angle; the threshold of a second included angle; the value range of a remainder obtained from dividing a first included angle by 90 or π/2; the threshold of a remainder obtained from dividing a first included angle by 90 or π/2; the value range of a remainder obtained from dividing a second included angle by 90 or π/2; or the threshold of a remainder obtained from dividing a second included angle by 90 or 7c/2.

In an embodiment, the information sent to the first terminal includes the first SCI, the first SCI includes positioning request information, and the positioning request information is configured to request the first terminal to send one of the following information: a second positioning reference signal, or a second positioning reference signal and second location information.

In an embodiment, an SCI reception module is also included in the information sending apparatus.

The SCI reception module is configured to receive second SCI. The second SCI is configured to indicate that the first terminal supports for being the anchor terminal.

In an embodiment, the second SCI is also configured to indicate a time limit for using the first terminal as the anchor terminal.

The information sending apparatus provided by this embodiment and the information sending method provided in the preceding embodiments belong to the same concept. For technical details not described in detail in this embodiment, reference may be made to any one of the preceding embodiments. This embodiment has the same effects as executing the information sending method.

Figure 13:
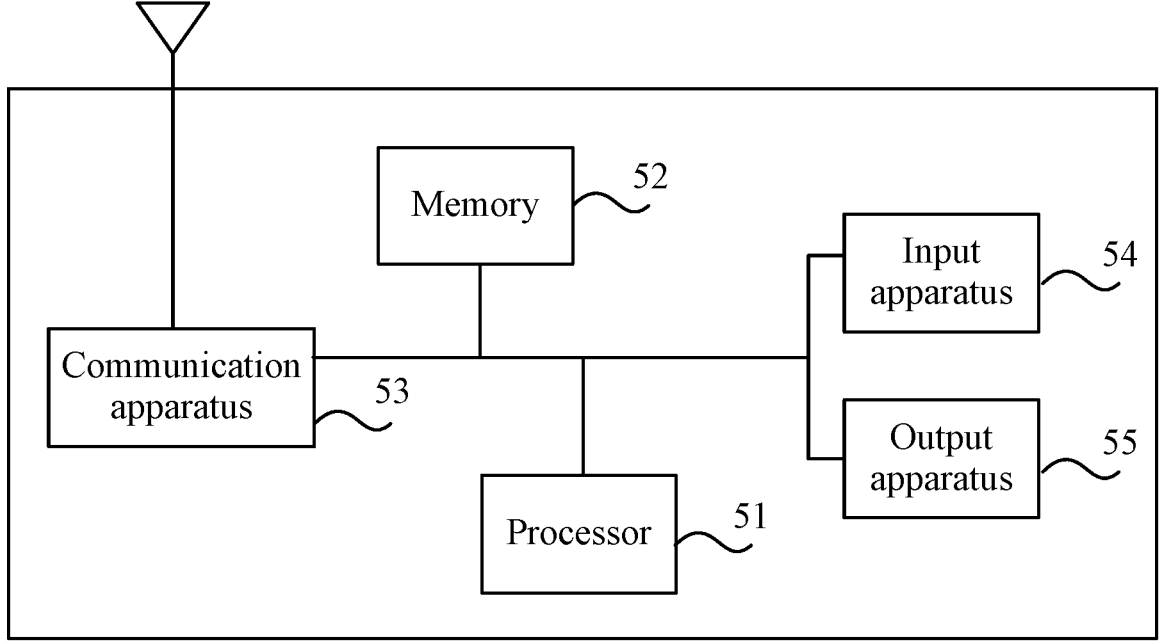
FIG. 13 is a diagram illustrating the structure of hardware of a communication node according to an embodiment.

Embodiments of the present application also provide a communication node. FIG. 13 is a diagram illustrating the structure of hardware of a communication node according to an embodiment. As shown in FIG. 13, the communication node provided by this application includes a memory 52, a processor 51, and a computer program stored on the memory and runnable on the processor. The processor 51, when executing the program, implements the preceding anchor terminal determination method.

The communication node may also include the memory 52. One or more processors 51 may be provided in the communication node, and one processor 51 is used as an example in FIG. 13. The memory 52 is configured to store one or more programs. When executed by the one or more processors 51, the one or more programs cause the one or more processors 51 to implement the anchor terminal determination method or the information sending method described in the embodiments of the present application.

The communication node also includes a communication apparatus 53, an input apparatus 54, and an output apparatus 55.

The processor 51, the memory 52, the communication apparatus 53, the input apparatus 54, and the output apparatus 55 in the communication node may be connected via a bus or in other manners. Connection via the bus is used as an example in FIG. 13.

The input apparatus 54 may be configured to receive input digital or character information and generate key signal input related to user settings and function control of the communication node. The output apparatus 55 may include a display device, for example, a display screen.

The communication apparatus 53 may include a receiver and a sender. The communication apparatus 53 is configured to perform information transceiving and communication under the control of the one or more processors 51.

As a computer-readable storage medium, the memory 52 may be configured to store software programs, computer-executable programs, and modules, such as program instructions/modules (for example, the reception module 310, the parameter determination module 320, and the anchor determination module 330 in the anchor determination apparatus) corresponding to the anchor terminal determination method according to embodiments of the present application. The memory 52 may include a program storage region and a data storage region. The program storage region may store an operating system and an application program required by at least one function. The data storage region may store data or the like created according to the use of the communication node. Additionally, the memory 52 may include a high-speed random-access memory and may also include a non-volatile memory such as at least one disk memory, flash memory, or another nonvolatile solid-state memory. In some examples, the memory 52 may include memories which are remotely disposed with respect to the processor 51, and these remote memories may be connected to the communication node via a network. Examples of the preceding network include, but are not limited to, the Internet, an intranet, a local area network, a mobile communication network, and a combination thereof.

Embodiments of the present application also provide a storage medium storing a computer program which, when executed by a processor, implements the anchor terminal determination method or the information sending method described in any embodiment of the present application.

The anchor determination method includes the following: A target parameter is determined according to the information sent by the target terminal, and it is determined that the first terminal is an anchor terminal in the case where the target parameter satisfies a set restriction condition.

The information sending method includes the following: information is sent to a first terminal, where the information sent to the first terminal is configured to determine at least one of a target parameter or a set restriction condition, and information sent by the first terminal as an anchor terminal is received in the case where the target parameter satisfies the set restriction condition.

A computer storage medium in this embodiment of the present application may adopt any combination of one or more computer-readable media. The computer-readable medium may be a computer-readable signal medium or a computer-readable storage medium. The computer-readable storage medium may be, for example, but is not limited to, an electrical, magnetic, optical, electromagnetic, infrared, or semiconductor system, apparatus, or device, or any combination thereof. Examples (a non-exhaustive list) of the computer-readable storage medium include an electrical connection having one or more wires, a portable computer magnetic disk, a hard disk, a random access memory (RAM), a read only memory (ROM), an erasable programmable read only memory (EPROM), a flash memory, an optical fiber, a portable compact disc read only memory (CD-ROM), an optical memory device, a magnetic memory device, or any suitable combination thereof. The computer-readable storage medium may be any tangible medium including or storing a program. The program may be used by or used in conjunction with an instruction execution system, apparatus, or device.

The computer-readable signal medium may include a data signal propagated in a baseband or as part of a carrier. The data signal carries computer-readable program codes. The data signal propagated in this manner may be in multiple forms and includes, but is not limited to, an electromagnetic signal, an optical signal, or any suitable combination thereof. The computer-readable signal medium may also be any computer-readable medium other than the computer-readable storage medium. The computer-readable medium may send, propagate, or transmit a program used by or used in conjunction with an instruction execution system, apparatus, or device.

The program codes included on the computer-readable medium may be transmitted on any suitable medium including, but not limited to, a wireless medium, a wire, an optical cable, a radio frequency (RF), or any suitable combination thereof.

Computer program codes for performing the operations of the present application may be written in one or more programming languages or a combination of multiple programming languages. The programming languages include object-oriented programming languages such as Java, Smalltalk, and C++ and may also include conventional procedural programming languages such as "C" or similar programming languages. The program codes may be executed entirely on a user computer, partly on a user computer, as a stand-alone software package, partly on a user computer and partly on a remote computer, or entirely on a remote computer or a server. In a case related to the remote computer, the remote computer may be connected to the user computer via any type of network including a local area network (LAN) or a wide area network (WAN) or may be connected to an external computer (for example, via the Internet through an Internet service provider).

The above are only example embodiments of the present application.

It is to be understood by those skilled in the art that the term user terminal encompasses any suitable type of wireless user devices, for example, a mobile phone, a portable data processing apparatus, a portable web browser, or a vehicle-mounted mobile station.

Generally speaking, various embodiments of the present application may be implemented in hardware or special-purpose circuits, software, logic, or any combination thereof. For example, some aspects may be implemented in hardware while another aspects may be implemented in firmware or software executable by a controller, a micro-processor, or another calculation apparatus, though the present application is not limited thereto.

Embodiments of the present application may be implemented through the execution of computer program instructions by a data processor of a mobile apparatus, for example, implemented in a processor entity, by hardware, or by a combination of software and hardware. The computer program instructions may be assembly instructions, instruction set architecture (ISA) instructions, machine instructions, machine-related instructions, microcodes, firmware instructions, state setting data, or source or object codes written in any combination of one or more programming languages.

A block diagram of any logic flow among the drawings of the present application may represent program procedures, may represent interconnected logic circuits, modules, and functions, or may represent a combination of program procedures with logic circuits, modules, and functions. Computer programs may be stored in a memory. The memory may be of any type suitable for a local technical environment and may be implemented by using any suitable data storage technology, such as, but not limited to, a read-only memory (ROM), a random access memory (RAM), and an optical memory apparatus and system (a digital video disc (DVD) or a compact disk (CD)). Computer-readable medium may include non-transitory storage medium. The data processor may be of any type suitable for a local technical environment, such as, but not limited to, a general-purpose computer, a special-purpose computer, a microprocessor, a digital signal processor (DSP), an application-specific integrated circuit (ASIC), a field-programmable gate array (FPGA), and a processor based on a multi-core processor architecture.

What is claimed is:

1. An anchor terminal determination method, being applied to a first terminal and comprising:
  receiving information sent by a target terminal;
  determining, according to the information sent by the target terminal, a target parameter; and
  determining that the first terminal is an anchor terminal in a case where the target parameter satisfies a set restriction condition;
  wherein the target terminal comprises at least one second terminal,
  information sent by each target terminal comprises first sidelink control information (SCI), wherein the first SCI comprises positioning request information, and
  the positioning request information is configured to request the first terminal to send one of the following information: a second positioning reference signal, or a second positioning reference signal and second location information.

2. The method of claim 1, wherein the information sent by the target terminal comprises at least one of:
  a first positioning reference signal; first SCI; a first positioning reference signal and first location information; a demodulation reference signal; or a target channel.

3. The method of claim 1, wherein the target parameter comprises at least one of:
  a road direction indicated by the target terminal for the first terminal; a road identity indicated by the target terminal for the first terminal;
  a movement direction indicated by the target terminal for the first terminal;
  a distance between the first terminal and the target terminal;
  reference signal received power (RSRP) of a reference signal received by the first terminal from the target terminal;
  a first included angle between a movement direction of the first terminal and a movement direction of the target terminal;
  a remainder obtained from dividing a first included angle between a movement direction of the first terminal and a movement direction of the target terminal by 90 or $\pi/2$;
  a second included angle between a road direction in which the first terminal is located and a road direction in which the target terminal is located;

a remainder obtained from dividing a second included angle between a road direction in which the first terminal is located and a road direction in which the target terminal by 90 or π/2 is located; or a user equipment identity of the anchor terminal.

4. The method of claim 1, wherein the set restriction condition comprises that a value of the target parameter does not exceed a set value range, wherein the set value range comprises at least one of:

a road direction in which the first terminal is located; an identity of a road in which the first terminal is located;

a movement direction of the first terminal;

a value range of a distance between the first terminal and the target terminal; a threshold of a distance between the first terminal and the target terminal;

a value range of RSRP of a reference signal received by the first terminal from the target terminal; a threshold of RSRP of a reference signal received by the first terminal from the target terminal;

a value range of a first included angle; a threshold of a first included angle;

a value range of a second included angle; a threshold of a second included angle;

a value range of a remainder obtained from dividing a first included angle by 90 or π/2; a threshold of a remainder obtained from dividing a first included angle by 90 or π/2;

a value range of a remainder obtained from dividing a second included angle by 90 or π/2; or a threshold of a remainder obtained from dividing a second included angle by 90 or π/2;

wherein the first included angle is an included angle between a movement direction of the first terminal and a movement direction of the target terminal; and the second included angle is an included angle between a road direction in which the first terminal is located and a road direction in which the target terminal is located.

5. The method of claim 1, wherein the target parameter comprises a user equipment identity of the anchor terminal, and the set restriction condition comprises that a source identity (ID) of the first terminal belongs to the user equipment identity of the anchor terminal.

6. The method of claim 1, wherein at least one target terminal is provided, and the set restriction condition comprises that a number of target terminals whose corresponding target parameters satisfy the set restriction condition does not exceed a number threshold; or the set restriction condition comprises that a number of target terminals whose corresponding target parameters satisfy the set restriction condition is smaller than a number threshold.

7. The method of claim 1, wherein the target terminal comprises at least one anchor terminal, and information sent by each target terminal comprises a first positioning reference signal and first location information.

8. The method of claim 1, wherein the set restriction condition comprises a first restriction condition and a second restriction condition, and determining that the first terminal is the anchor terminal in the case where the target parameter satisfies the set restriction condition comprises:

determining that the first terminal is a candidate anchor terminal in a case of the target parameter satisfying the first restriction condition; and determining that the first terminal is the anchor terminal in a case of the second restriction condition being satisfied.

9. The method of claim 8, wherein at least one target terminal is provided, and the first restriction condition comprises that a number of target terminals whose corresponding target parameters satisfy the set restriction condition does not exceed a number threshold; or the first restriction condition comprises that a number of target terminals whose corresponding target parameters satisfy the set restriction condition is smaller than a number threshold.

10. The method of claim 8, further comprising:

determining a time-frequency resource for sending a second positioning reference signal in a case where the first terminal is determined as the candidate anchor terminal;

wherein determining that the first terminal is the anchor terminal in the case of the second restriction condition being satisfied, comprises:

detecting a third positioning reference signal sent by a non-first terminal;

in a case where a detection result of the third positioning reference signal satisfies the second restriction condition, determining that the first terminal is the anchor terminal and sending the second positioning reference signal, and in a case where the detection result of the third positioning reference signal does not satisfy the second restriction condition, determining that the first terminal is not the anchor terminal according to the detection result of the third positioning reference signal, and canceling sending of the second positioning reference signal; or, in a case where a detection result of the third positioning reference signal does not satisfy the second restriction condition, determining that the first terminal is the anchor terminal and sending the second positioning reference signal, and in a case where the detection result of the third positioning reference signal satisfies the second restriction condition, determining that the first terminal is not the anchor terminal according to the detection result of the third positioning reference signal, and canceling sending of the second positioning reference signal.

11. The method of claim 8, further comprising:

determining a time-frequency resource of a target channel and a time-frequency resource of a second positioning reference signal in a case where the first terminal is determined as the candidate anchor terminal, wherein the target channel is configured to indicate the time-frequency resource of the second positioning reference signal;

wherein determining that the first terminal is the anchor terminal in the case of the second restriction condition being satisfied, comprises:

detecting a target channel sent by a non-first terminal; and in a case where a detection result of the target channel satisfies the second restriction condition, determining that the first terminal is the anchor terminal and sending the second positioning reference signal, and in a case where the detection result of the target channel does not satisfy the second restriction condition, determining that the first terminal is not the anchor terminal, and canceling sending of the target channel; or in a case where a detection result of the target channel does not satisfy the second restriction condition, determining that the first terminal is the anchor terminal and sending the second positioning reference signal, and in a case where the detection result of the target channel satisfies the second restriction condition, determining that the first terminal is not the anchor terminal, and canceling sending of the target channel.

12. The method of claim 1, further comprising:

sending, by the first terminal, second SCI, wherein the second SCI is configured by the first terminal to indicate that the first terminal supports for being the anchor terminal.

13. A non-transitory computer-readable storage medium storing a computer program which, when executed by a processor, implements the anchor terminal determination method of claim 1.

14. An information sending method, being applied to a target terminal and comprising:

sending information to a first terminal, wherein the information sent to the first terminal is configured to determine at least one of a target parameter or a set restriction condition; and receiving information sent by the first terminal as an anchor terminal in a case where the target parameter satisfies the set restriction condition;

wherein the target terminal comprises at least one second terminal, the information sent to the first terminal comprises first sidelink control information (SCI), wherein the first SCI comprises positioning request information, and the positioning request information is configured to request the first terminal to send one of the following information: a second positioning reference signal, or a second positioning reference signal and second location information.

15. The method of claim 14, wherein the first SCI comprises a user equipment identity of the anchor terminal;

wherein the user equipment identity of the anchor terminal is a source identity (ID) of the anchor terminal.

16. The method of claim 14, wherein the target parameter comprises at least one of:

a road direction indicated by the target terminal for the first terminal; a road identity indicated by the target terminal for the first terminal;

a movement direction indicated by the target terminal for the first terminal;

a distance between the first terminal and the target terminal;

reference signal received power (RSRP) of a reference signal received by the first terminal from the target terminal;

a first included angle between a movement direction of the first terminal and a movement direction of the target terminal;

a remainder obtained from dividing a first included angle between a movement direction of the first terminal and a movement direction of the target terminal by 90 or $\pi/2$;

a second included angle between a road direction in which the first terminal is located and a road direction in which the target terminal is located;

a remainder obtained from dividing a second included angle between a road direction in which the first terminal and a road direction in which the target terminal by 90 or $\pi/2$ is located; or a user equipment identity of the anchor terminal.

17. The method of claim 14, wherein the first SCI comprises the set restriction condition; and the set restriction condition comprises that a value of the target parameter does not exceed a set value range;

wherein the set value range comprises at least one of:

a road direction in which the first terminal is located; an identity of a road in which the first terminal is located;

a movement direction of the first terminal;

a value range of a distance between the first terminal and the target terminal; a threshold of a distance between the first terminal and the target terminal;

a value range of RSRP of a reference signal received by the first terminal from the target terminal; a threshold of RSRP of a reference signal received by the first terminal from the target terminal;

a value range of a first included angle; a threshold of a first included angle;

a value range of a second included angle; a threshold of a second included angle;

a value range of a remainder obtained from dividing a first included angle by 90 or $\pi/2$; a threshold of a remainder obtained from dividing a first included angle by 90 or $\pi/2$;

a value range of a remainder obtained from dividing a second included angle by 90 or $\pi/2$; or a threshold of a remainder obtained from dividing a second included angle by 90 or $\pi/2$;

wherein the first included angle is an included angle between a movement direction of the first terminal and a movement direction of the target terminal; and the second included angle is an included angle between a road direction in which the first terminal is located and a road direction in which the target terminal is located.

18. A communication node, comprising a memory, a processor, and a computer program stored on the memory and runnable on the processor, wherein the processor, when executing the computer program, implements the following:

receiving information sent by a target terminal;

determining, according to the information sent by the target terminal, a target parameter; and determining that a first terminal is an anchor terminal in a case where the target parameter satisfies a set restriction condition;

wherein the target terminal comprises at least one second terminal, information sent by each target terminal comprises first sidelink control information (SCI), wherein the first SCI comprises positioning request information, and the positioning request information is configured to request the first terminal to send one of the following information: a second positioning reference signal, or a second positioning reference signal and second location information.

19. The communication node of claim 18, wherein the information sent by the target terminal comprises at least one of:

a first positioning reference signal; first SCI; a first positioning reference signal and first location information; a demodulation reference signal; or a target channel.

20. The communication node of claim 18, wherein the target parameter comprises at least one of:

a road direction indicated by the target terminal for the first terminal; a road identity indicated by the target terminal for the first terminal;

a movement direction indicated by the target terminal for the first terminal;

a distance between the first terminal and the target terminal;

reference signal received power (RSRP) of a reference signal received by the first terminal from the target terminal;

a first included angle between a movement direction of the first terminal and a movement direction of the target terminal;

a remainder obtained from dividing a first included angle between a movement direction of the first terminal and a movement direction of the target terminal by 90 or $\pi/2$;

a second included angle between a road direction in which the first terminal is located and a road direction in which the target terminal is located;

a remainder obtained from dividing a second included angle between a road direction in which the first terminal is located and a road direction in which the target terminal by 90 or $\pi/2$ is located; or a user equipment identity of the anchor terminal.

\* \* \* \* \*